US007765024B2

(12) United States Patent
Brandt et al.

(10) Patent No.: US 7,765,024 B2
(45) Date of Patent: Jul. 27, 2010

(54) METHODS AND MEDIA FOR PROCESSING MAILPIECE INFORMATION IN A MAIL PROCESSING DEVICE USING SORTER APPLICATION SOFTWARE

(75) Inventors: Bruce A. Brandt, Gainesville, VA (US); Jay David Fadely, Palmetto, FL (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 11/896,148

(22) Filed: Aug. 30, 2007

(65) Prior Publication Data

US 2008/0086233 A1    Apr. 10, 2008

Related U.S. Application Data

(62) Division of application No. 11/208,768, filed on Aug. 23, 2005, which is a division of application No. 09/652,275, filed on Aug. 31, 2000, now Pat. No. 7,081,595.

(60) Provisional application No. 60/152,194, filed on Aug. 31, 1999.

(51) Int. Cl.
*G07F 7/00* (2006.01)
(52) U.S. Cl. .................................. 700/224
(58) Field of Classification Search .................. 700/224
See application file for complete search history.

(56) References Cited

U.S. PATENT DOCUMENTS 2,709,001 A   5/1955  Stahl

| 2,719,629 A | 10/1955 | Robinson |
| 2,895,588 A | 7/1959 | Van Marie |
| 3,015,389 A | 1/1962 | Levy |
| 3,038,607 A | 6/1962 | Ekert, Jr. |
| 3,215,271 A | 11/1965 | Cecchini |
| 3,266,626 A | 8/1966 | Simjian |
| 3,320,593 A | 5/1967 | Hedrick et al. |
| 3,384,755 A | 5/1968 | Williamson et al. |
| 3,533,657 A | 10/1970 | Da Silva |
| 3,750,167 A | 7/1973 | Gehman et al. |
| 3,781,800 A | 12/1973 | Cramer et al. |
| 3,933,094 A | 1/1976 | Murphy et al. |
| 3,953,730 A | 4/1976 | Henry et al. |
| 3,981,590 A | 9/1976 | Perkins |
| 4,058,217 A | 11/1977 | Vaughan et al. |
| 4,119,194 A | 10/1978 | Freeman et al. |
| 4,247,008 A | 1/1981 | Dobbs |
| 4,310,754 A | 1/1982 | Check, Jr. et al. |

(Continued)

FOREIGN PATENT DOCUMENTS

EP    0 272 355    6/1988

(Continued)

*Primary Examiner*—Patrick Mackey
*Assistant Examiner*—Michael E. Butler
(74) *Attorney, Agent, or Firm*—Finnegan, Henderson, Farabow, Garrett & Dunner, LLP

(57) ABSTRACT

Apparatus and methods consistent with the present invention provide for processing mailpiece information in a mail processing device using sorter application software. In one embodiment, a mail processing device uses the sorter application software to communicate with an identification code server. In this embodiment, different types of mail processing devices can use the common sorter application software to communicate with the same or different identification code servers.

20 Claims, 35 Drawing Sheets

U.S. PATENT DOCUMENTS

| | | |
|---|---|---|
| 4,317,030 A | 2/1982 | Berghell |
| 4,388,994 A | 6/1983 | Suda et al. |
| 4,514,815 A | 4/1985 | Anderson |
| 4,516,264 A | 5/1985 | Corvari et al. |
| 4,520,932 A | 6/1985 | Matsuda et al. |
| 4,632,252 A | 12/1986 | Haruki et al. |
| 4,660,221 A | 4/1987 | Dlugos |
| 4,731,741 A | 3/1988 | Allen |
| 4,741,047 A | 4/1988 | Sharpe, II |
| 4,743,747 A | 5/1988 | Fougere et al. |
| 4,752,675 A | 6/1988 | Zetmeir |
| 4,783,825 A | 11/1988 | Hirose et al. |
| 4,796,196 A | 1/1989 | Durst, Jr. et al. |
| 4,800,504 A | 1/1989 | Durst, Jr. et al. |
| 4,800,505 A | 1/1989 | Axelrod et al. |
| 4,801,789 A | 1/1989 | Davis |
| 4,832,204 A | 5/1989 | Handy et al. |
| 4,838,435 A | 6/1989 | Alexandre et al. |
| 4,868,570 A | 9/1989 | Davis |
| 4,886,596 A | 12/1989 | Sasage et al. |
| 5,005,124 A | 4/1991 | Connell et al. |
| 5,008,827 A | 4/1991 | Sansone et al. |
| 5,009,321 A | 4/1991 | Keough |
| 5,018,072 A | 5/1991 | Ibamoto et al. |
| 5,025,475 A | 6/1991 | Okabe |
| 5,031,223 A | 7/1991 | Rosenbaum et al. |
| 5,042,667 A | 8/1991 | Keough |
| 5,043,908 A | 8/1991 | Manduley et al. |
| 5,050,078 A | 9/1991 | Sansone |
| 5,072,400 A | 12/1991 | Manduley |
| 5,098,130 A | 3/1992 | Mikhail |
| 5,142,482 A | 8/1992 | Sansone |
| 5,143,225 A | 9/1992 | Rabindran et al. |
| 5,186,336 A | 2/1993 | Pippin et al. |
| 5,198,655 A | 3/1993 | Suetsugu et al. |
| 5,216,620 A | 6/1993 | Sansone |
| 5,249,687 A | 10/1993 | Rosenbaum et al. |
| 5,264,665 A | 11/1993 | Delfer, III |
| 5,287,271 A | 2/1994 | Rosenbaum |
| 5,291,002 A | 3/1994 | Agnew et al. |
| 5,292,004 A | 3/1994 | Cesarini |
| 5,306,901 A | 4/1994 | Schechner et al. |
| 5,313,051 A | 5/1994 | Brigida et al. |
| 5,313,070 A | 5/1994 | Vala et al. |
| 5,324,927 A | 6/1994 | Williams |
| 5,329,589 A | 7/1994 | Fraser et al. |
| 5,341,505 A | 8/1994 | Whitehouse |
| 5,363,967 A | 11/1994 | Tilles et al. |
| 5,388,049 A | 2/1995 | Sansone et al. |
| 5,420,403 A | 5/1995 | Allum et al. |
| 5,422,821 A | 6/1995 | Allen et al. |
| 5,446,667 A | 8/1995 | Oh et al. |
| 5,468,945 A | 11/1995 | Huggett et al. |
| 5,469,362 A | 11/1995 | Hunt et al. |
| 5,470,427 A | 11/1995 | Mikel et al. |
| 5,510,608 A | 4/1996 | Williams |
| 5,514,863 A | 5/1996 | Williams |
| 5,518,122 A | 5/1996 | Tilles et al. |
| 5,538,138 A | 7/1996 | Reich |
| 5,554,842 A | 9/1996 | Connell et al. |
| 5,557,096 A | 9/1996 | Watanabe et al. |
| 5,558,232 A | 9/1996 | Stevens et al. |
| 5,586,036 A | 12/1996 | Pintsov |
| 5,586,037 A | 12/1996 | Gil et al. |
| 5,593,044 A | 1/1997 | Yamashita et al. |
| 5,602,382 A | 2/1997 | Ulvr et al. |
| 5,607,187 A | 3/1997 | Salive et al. |
| 5,612,888 A | 3/1997 | Chang et al. |
| 5,612,889 A | 3/1997 | Pintsov et al. |
| 5,627,517 A | 5/1997 | Theimer et al. |
| 5,630,072 A | 5/1997 | Dobbins |
| 5,633,487 A | 5/1997 | Schmutz et al. |
| 5,635,694 A | 6/1997 | Tuhro |
| 5,659,163 A | 8/1997 | Lagan et al. |
| 5,667,078 A | 9/1997 | Walach |
| 5,668,990 A | 9/1997 | Bajorinas et al. |
| 5,703,783 A | 12/1997 | Allen et al. |
| 5,712,787 A | 1/1998 | Yeung |
| 5,712,789 A | 1/1998 | Radican |
| 5,726,897 A | 3/1998 | Tammi et al. |
| 5,734,568 A | 3/1998 | Borgendale et al. |
| 5,745,590 A | 4/1998 | Pollard |
| 5,758,574 A | 6/1998 | Bernardo et al. |
| 5,770,841 A | 6/1998 | Moed et al. |
| 5,794,790 A | 8/1998 | Bonnet |
| 5,805,710 A | 9/1998 | Higgins et al. |
| 5,842,577 A | 12/1998 | Stevens et al. |
| 5,852,813 A | 12/1998 | Guenther et al. |
| 5,925,864 A | 7/1999 | Sansone et al. |
| 5,957,296 A | 9/1999 | Altenburg et al. |
| 5,959,288 A | 9/1999 | Tajiri et al. |
| 5,974,147 A | 10/1999 | Cordery et al. |
| 5,998,753 A | 12/1999 | Darchis et al. |
| 6,003,677 A | 12/1999 | Foley |
| 6,039,257 A | 3/2000 | Berson et al. |
| 6,075,873 A | 6/2000 | Kondou et al. |
| 6,156,988 A | 12/2000 | Baker |
| 6,175,826 B1 | 1/2001 | Malandra, Jr. et al. |
| 6,178,411 B1 | 1/2001 | Reiter |
| 6,205,373 B1 | 3/2001 | Hart et al. |
| 6,208,910 B1 | 3/2001 | Michael et al. |
| 6,224,527 B1 | 5/2001 | Pinchin et al. |
| 6,236,009 B1 | 5/2001 | Emigh et al. |
| 6,239,397 B1 | 5/2001 | Rosenbaum et al. |
| 6,266,575 B1 | 7/2001 | Anderson, Jr. et al. |
| 6,269,171 B1 | 7/2001 | Gozzo et al. |
| 6,279,750 B1 | 8/2001 | Lohmann |
| 6,291,785 B1 | 9/2001 | Koga et al. |
| 6,292,709 B1 | 9/2001 | Uhl et al. |
| 6,311,104 B1 | 10/2001 | Shea et al. |
| 6,316,741 B1 | 11/2001 | Fitzgibbons et al. |
| 6,381,342 B2 | 4/2002 | Foley |
| 6,403,906 B1 | 6/2002 | De Leo et al. |
| 6,421,451 B1 | 7/2002 | Shiratsuchi et al. |
| 6,437,272 B2 | 8/2002 | Tamamoto et al. |
| 6,456,776 B2 | 9/2002 | Hetzer |
| 6,487,302 B2 | 11/2002 | Foley |
| 6,496,810 B1 | 12/2002 | Pollard et al. |
| 6,549,892 B1 | 4/2003 | Sansone |
| 6,557,755 B1 | 5/2003 | Pickering, Jr. et al. |
| 6,610,955 B2 | 8/2003 | Lopez |
| 6,625,382 B2 | 9/2003 | Hetzer et al. |
| 6,671,577 B2 | 12/2003 | Barnum et al. |
| 6,674,038 B1 | 1/2004 | Latta |
| 6,697,500 B2 | 2/2004 | Woolston et al. |
| 6,894,243 B1 | 5/2005 | Avant et al. |
| 6,976,621 B1 | 12/2005 | Avant et al. |
| 6,977,353 B1 | 12/2005 | Avant et al. |
| 7,060,925 B1 | 6/2006 | Avant et al. |
| 2002/0069187 A1 | 6/2002 | Barnum et al. |
| 2002/0122569 A1 | 9/2002 | Coffelt et al. |

FOREIGN PATENT DOCUMENTS

| | | |
|---|---|---|
| EP | 0 529 966 | 1/1996 |
| GB | 2 342 745 | 4/2000 |
| JP | 63-101982 | 5/1988 |
| JP | 3026187 | 2/1991 |
| JP | 4160581 | 6/1992 |
| JP | 4326187 | 11/1992 |
| JP | 5029966 | 2/1993 |
| JP | 6154710 A2 | 6/1994 |
| NL | 8501150 A | 11/1986 |

METHODS AND MEDIA FOR PROCESSING MAILPIECE INFORMATION IN A MAIL PROCESSING DEVICE USING SORTER APPLICATION SOFTWARE

This is a division of application Ser. No. 11/208,768, filed Aug. 23, 2005, which is a division of application Ser. No. 09/652,275, filed Aug. 31, 2000, now U.S. Pat. No. 7,081,595 which claimed the benefit under 35 U.S.C. §119(e) of U.S. provisional application No. 60/152,194, filed on Aug. 31, 1999, all of which are incorporated herein by reference.

BACKGROUND OF THE INVENTION

A. Field of the Invention

The present invention relates to apparatus and methods for identifying and processing mail. More particularly, the present invention relates to apparatus and methods for using an identification code on a mailpiece as a redundant source of identification for identifying and processing the mailpiece in a mail sorting system.

B. Description of the Related Art

Conventional systems for identifying and processing (e.g., sorting) mail require both human and mechanical operations. Human operations are initially required to load the mail from a mail delivery repository into a mechanical identification and processing system. Mechanical operations then attempt to identify the delivery address for each mailpiece and, if successful, to then process each mailpiece based on the delivery address. Processing a mailpiece can be, for example, sorting the mailpiece. If there is a failure to identify the delivery address of a mailpiece mechanically, human operators copy of the ZIP code in bar code format, and the POSTNET code can be used to route a mailpiece, if the ZIP code cannot be read. The ITEM code represents a unique code in bar code format, and the ITEM code can be used to identify each particular mailpiece, if the RBCS cannot otherwise identify the mailpiece. For example, in the RBCS, the ITEM code can be linked to an electronic image of the mailpiece taken at the time the mailpiece is marked with the ITEM code by the RBCS. So, if the RBCS cannot identify a mailpiece, the RBCS can recall the electronic image of the mailpiece, which contains a destination address, including the POSTNET code.

The identification and processing of mail in the RBCS is dependent upon the use of either the POSTNET code or the ITEM code. When each mailpiece is identified by the RBCS, the ITEM code is first stored temporarily until the mailpiece receives the POSTNET code and has been processed by the RBCS. If the POSTNET code becomes illegible during processing, the ITEM code may be used to obtain the POSTNET code. The ITEM code is used to store a copy of the POSTNET code in a short-term memory until the RBCS has processed the mailpiece based on the POSTNET code. However, once the mailpiece has been processed and sorted based on the POSTNET code, the RBCS can no longer access the ITEM code, because the RBCS cannot store the ITEM code locally or transmit the ITEM code to other RBCS sites.

As a result, a number of problems can arise if the POSTNET code cannot be read by the RBCS. For instance, the POSTNET code on a mailpiece might be illegible are required again to identify the delivery address. Likewise, if there is a failure to process the mailpiece based on the delivery address, human operators are also required again to process the mailpiece. Therefore, conventional systems for identifying and processing mail are dependent upon human operators, if the mechanical systems are unable to identify or process a mailpiece.

To identify mail with the conventional systems, mail is loaded into a mechanical identification system, which automatically feeds each mailpiece into an optical character reader (OCR) machine. The OCR machine then attempts to "electronically read" the delivery address from the mailpiece in order to place the delivery address in a computer. If the OCR machine cannot read the delivery address (e.g., the ZIP code), the mechanical device rejects the mailpiece. The rejected mailpiece may then be fed into another mechanical device, which presents the mailpiece to a human operator, who "physically reads" the delivery address off the mailpiece and key punches the delivery address into a computer. Once the delivery address has been either electronically or physically read and placed into a computer, the computer prints the delivery address on the mailpiece, using a special code (e.g., a bar code, such as, a POSTNET code).

To process mail with the conventional systems, mail is loaded into a mechanical processing system, which automatically sorts each mailpiece by the destination address. The majority of conventional mechanical processing systems sort each mailpiece based on a special code, such as, a ZIP code or a bar code (i.e., a POSTNET code). These mechanical processing systems may contain an OCR machine, which can read and sort a mailpiece based on the ZIP code. These mechanical processing systems may also contain a Bar Code Sorter, which can read and sort a mailpiece based on the POSTNET code. If the mechanical processing system cannot read either the ZIP code or the POSTNET code, the system rejects the mailpiece. The rejected mailpiece may then be processed by a human operator. The human operator may then determine why the mechanical processing system rejected the mailpiece, solve the problem (e.g., determine the ZIP code or reaffix the POSTNET code to the mailpiece), and then reload the mailpiece into the mechanical processing system for processing.

To improve upon these conventional systems for identifying and processing mail, the United States Postal Service developed an automated sorting system, described in U.S. Pat. No. 4,992,649 (the '649 patent), which is herein incorporated by reference. One embodiment of the system disclosed in the '649 patent is a Remote Bar Code System (RBCS). The embodiment of the RBCS described in the '649 patent provides for the electronic sorting of mail using a bar code that is placed on the front of each mailpiece, known as the POSTNET code, and another bar code that is placed on the back of each mailpiece, known as the ITEM code.

In the RBCS, the POSTNET code corresponds to the delivery address for the mailpiece, and the ITEM code corresponds to the mailpiece itself (i.e., the ITEM code is a means to "identify" each particular mailpiece). The POSTNET code represents a as soon as it is applied due to the color or pattern of the mailpiece. If so, the mailpiece may be fed into a letter mail labeling machine that applies a white label to cover the illegible POSTNET code, and then, the mailpiece may be again fed into the RBCS system for identification (and printing of a new POSTNET code on the white label). Additionally, the POSTNET code might be legible when applied, but become illegible during subsequent processing of the mailpiece. Because the ITEM code is only stored until the completion of the initial processing, the RBCS cannot use the ITEM code to identify the POSTNET code during subsequent processing and sorting. Therefore, if the POSTNET code becomes illegible during subsequent processing, the mailpiece can no longer be sorted automatically by the RBCS. These problems with the RBCS result in severe disadvantages, including diminishing the efficiency of the systems for identifying and processing mail and requiring excessive human intervention.

As indicated above, there are a number of shortcomings incumbent with these conventional systems for identifying and processing mail. It is therefore desirable to overcome these shortcomings by developing apparatus and methods to identify and process mail when the ZIP code is illegible. It is also desirable to overcome these shortcomings by developing apparatus and methods to identify and process mail when the POSTNET code is illegible. It is further desirable to overcome these shortcomings by developing apparatus and methods to identify and process mail when the ITEM code is illegible. It is still further desirable to overcome these shortcomings by developing apparatus and methods to establish a redundant identification code, which may be globally used by a system for identifying and processing mail. It is additionally desirable to overcome these shortcomings by developing apparatus and methods to read an identification code by a system for identifying and processing mail. It is still additionally desirable to overcome these shortcomings by developing apparatus and methods to identify and process mail where a redundant identification code is used with a global system for identifying and processing mail, where one or more the nodes of the system are connected via hardware or software.

SUMMARY OF THE INVENTION

Apparatus and methods consistent with the present invention overcome the shortcomings of the conventional systems by using an identification code on the back of each mailpiece as a redundant source of identification for identifying and processing mail in a mail sorting system.

Apparatus and methods consistent with the present invention process mailpiece information in a mail processing device using sorter application software. When a first prompt is received from an operator of the mail processing device, a connection is initiated between the mail processing device and an identification code server, via the sorter application software. Mailpiece information is processed between the mail processing device and the identification code server, via the sorter application software. When a second prompt is received from the operator of the mail processing device, the connection between the mail processing device and the identification code server is terminated.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

In the drawings.

DETAILED DESCRIPTION

A. Introduction

Apparatus and methods consistent with the present invention provide for identifying and processing mail using an identification code on a mailpiece as a redundant source of identification information in a mail sorting system. In one embodiment, this information is stored in a temporary database and used for the identification and processing of mail in a Remote Bar Code System (RBCS). In this embodiment, the identification code enables the automation of mail sorting and other processing tasks, reducing costs and delays in mail delivery services. In another embodiment, the identification and processing of mail occurs in an Identification Code Sorting (ICS) system. In this embodiment, a long-term database allows for mail sorting and other processing tasks on a national or global level.

Reference will now be made in detail to various embodiments of the invention, examples of which are illustrated in the accompanying drawings. Other embodiments of the invention will be apparent to those skilled in the art from consideration of the specification and practice of the invention disclosed herein. It is intended that the specification and examples be considered as exemplary only, with a true scope and spirit of the invention being indicated by the appended claims.

B. Overview of a System for Identifying and Processing Mail

Figure 1:
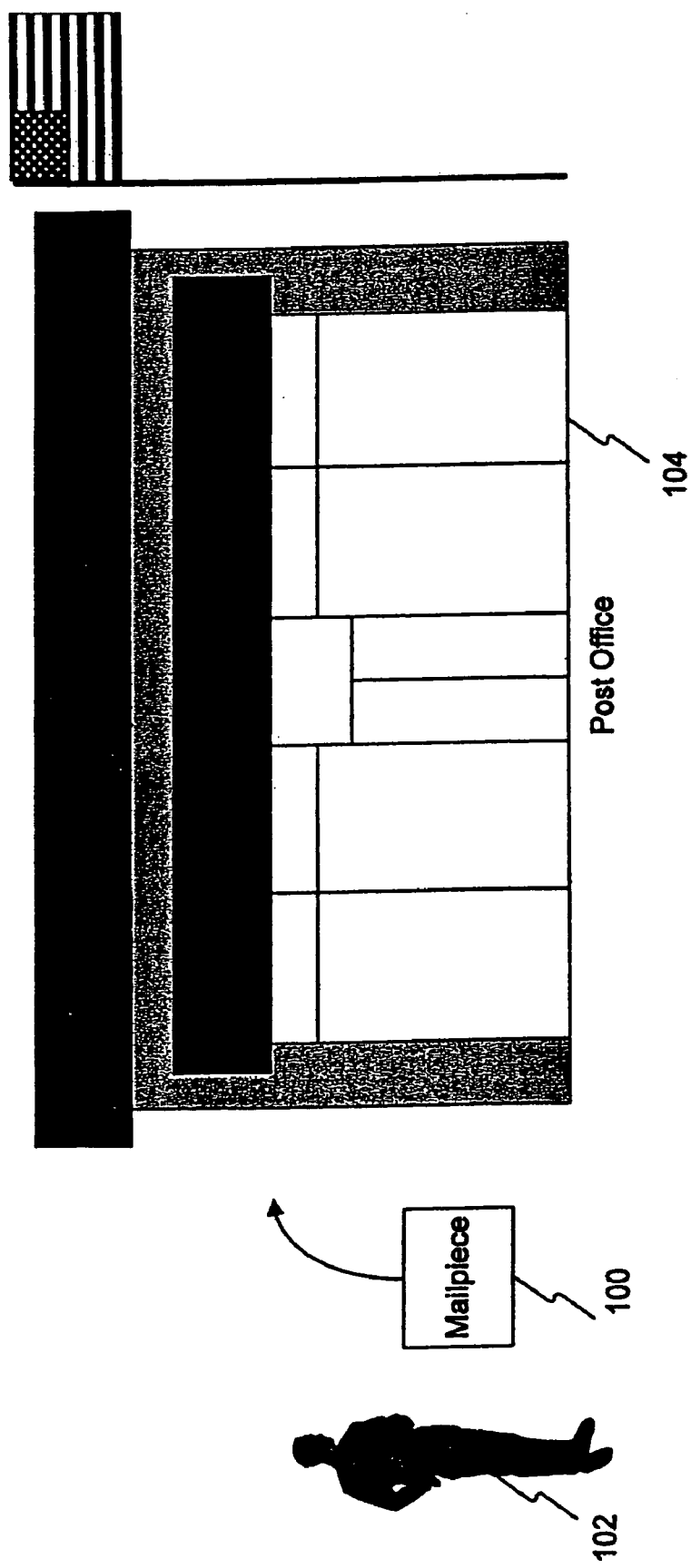
FIG. 1 illustrates a simplified overview of the initial components or steps in apparatus or methods for identifying and processing a mailpiece consistent with the present invention.

FIG. 1 illustrates a simplified overview of the initial components or steps in apparatus or methods for identifying and processing a mailpiece consistent with the present invention. In FIG. 1, a mailpiece 100 is delivered by a postal customer 102 to a Post Office 104. Mailpiece 100 can be, for example, a letter or a package that postal customer 102 wishes to send to a destination address. To do so, postal customer 102 marks mailpiece 100 with a destination address and delivers it to Post Office 104. Post Office 104 can be a United States Postal Service (USPS) Post Office, a USPS mailbox, or any other facility or location capable of receiving a mailpiece or other item for delivery to a destination address using a system for identifying and processing mail.

1. POSTNET Code

Figure 2A:
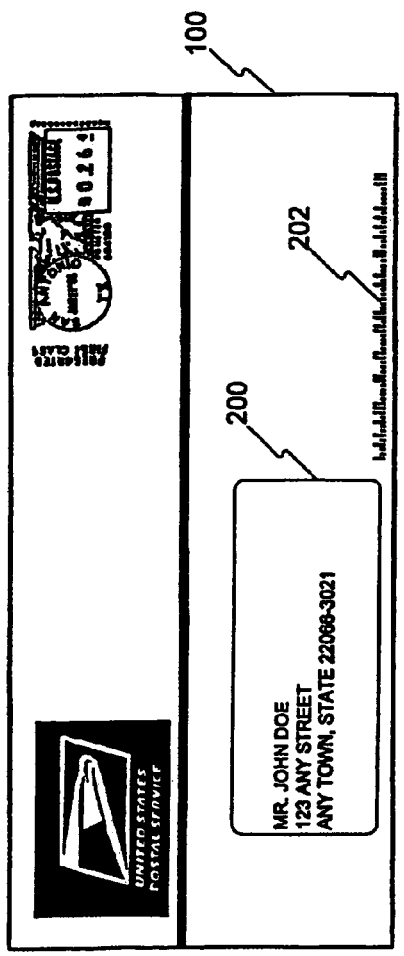
FIGS. 2A and 2B illustrate embodiments of a mailpiece, consistent with apparatus or methods for identifying and processing mail consistent with one embodiment of the present invention.
Figure 2B:
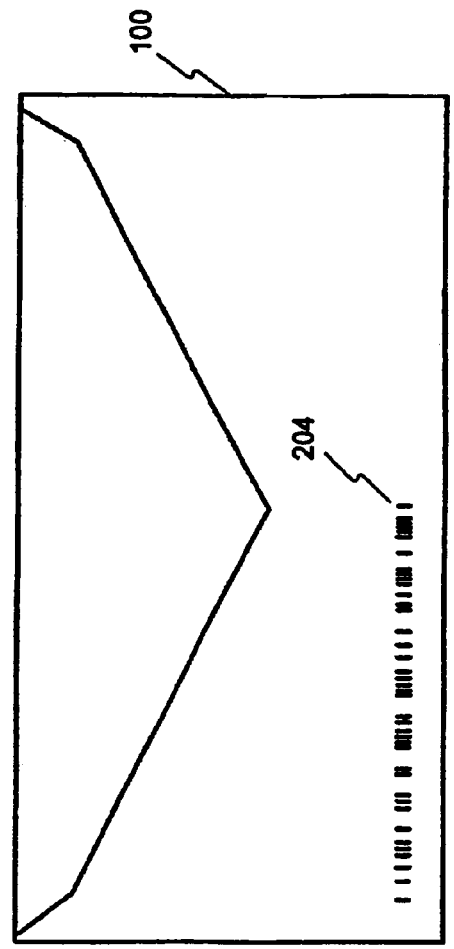

FIGS. 2A and 2B illustrate embodiments of a mailpiece, consistent with apparatus or methods for identifying and processing mail consistent with one embodiment of the present invention. As shown in FIG. 2A, mailpiece 100 contains two sources of delivery information, a destination address 200 and a POSTNET code 202 corresponding to destination address 200. For example, POSTNET code 202 can correspond to the ZIP code portion of destination address 200. POSTNET code 202 can be placed on mailpiece 100 by postal customer 102 or by the USPS at a processing center, e.g., Post Office 104. In systems consistent with apparatus or methods for identifying and processing mail consistent with one embodiment of the present invention, POSTNET code 202 can be read and used to route mailpiece 100 to a delivery facility, such as a Post Office, corresponding to destination address 200 for the delivery information. Therefore, if destination address 200 is illegible, POSTNET code 202 provides an alternative source of delivery information.

2. Identification Tag (ID Tag)

As shown in FIG. 2B, in one embodiment, mailpiece 100 includes an identification code 204, also known as an identification tag (ID Tag), which is unique to mailpiece 100. ID Tag 204 provides an alternative source of delivery information in one embodiment of systems using apparatus or methods for identifying and processing mail consistent with the present invention. ID Tag 204 is printed on the back of mailpiece 100 and represents a unique identification source for identifying mailpiece 100. ID Tag 204 may be printed on mailpiece 100 in fluorescent ink. As described below, in one embodiment of systems consistent with the present invention, ID Tag 204 is used as a redundant source of identification throughout all phases of a mail identification and processing system.

Figure 3:
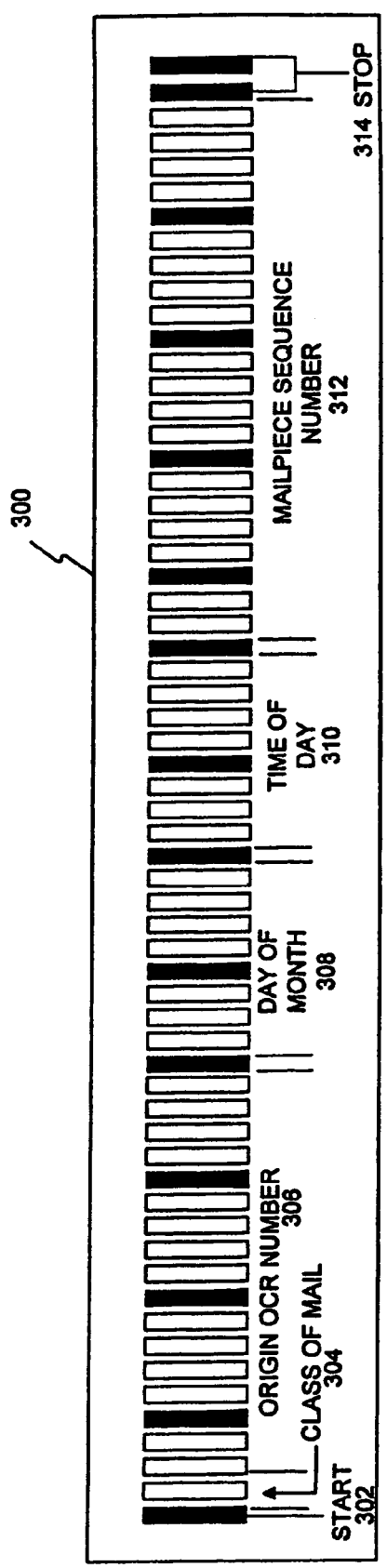
FIG. 3 shows an embodiment of an ID Tag in greater detail, as shown in FIG. 2B.

FIG. 3 shows an embodiment of an ID Tag in greater detail, as shown in FIG. 2B. In this embodiment of the present invention, ID Tag 204 is represented by ID Tag bar code 300. ID Tag bar code 300 can contain bars and spaces indicating various information about mailpiece 100, including class of mail 304, origin optical character reader (OCR) number 306, day of the month 308, time of day 310, and mailpiece sequence number 312. Class of mail code 304 can be represented by a single bit, representing either a 0 or a 1 to indicate mail classification. Origin OCR number 306 can be a series of 14 bits representing a machine ID number between 1 and 3,999. Day of month code 308 can be a series of 7 bits representing a day of the month between 1 and 31. Time of day code 310 can be a series of 7 bits representing a time of day, measured in half hour increments, between 0 and 47. Mailpiece sequence number 312 can be a series of 18 bits representing a mailpiece sequence order from 1 to 25,000. In addition, ID Tag bar code 300 representing ID Tag 204 also contains a start code (such as a start bit) and a stop code (such as a stop bit). In ID Tag bar code 300, start code 302 is represented by a single bit and stop code 314 is represented by two bits. In one embodiment of systems consistent with the present invention, the combination of information represented in ID Tag bar code 300 uniquely identifies mailpiece 100. However, ID Tag 204 may be represented by formats other than ID Tag bar code 300.

C. Overview of Code-Based Systems for Identification and Processing Mail

1. Overview of RBCS

Figure 4A:
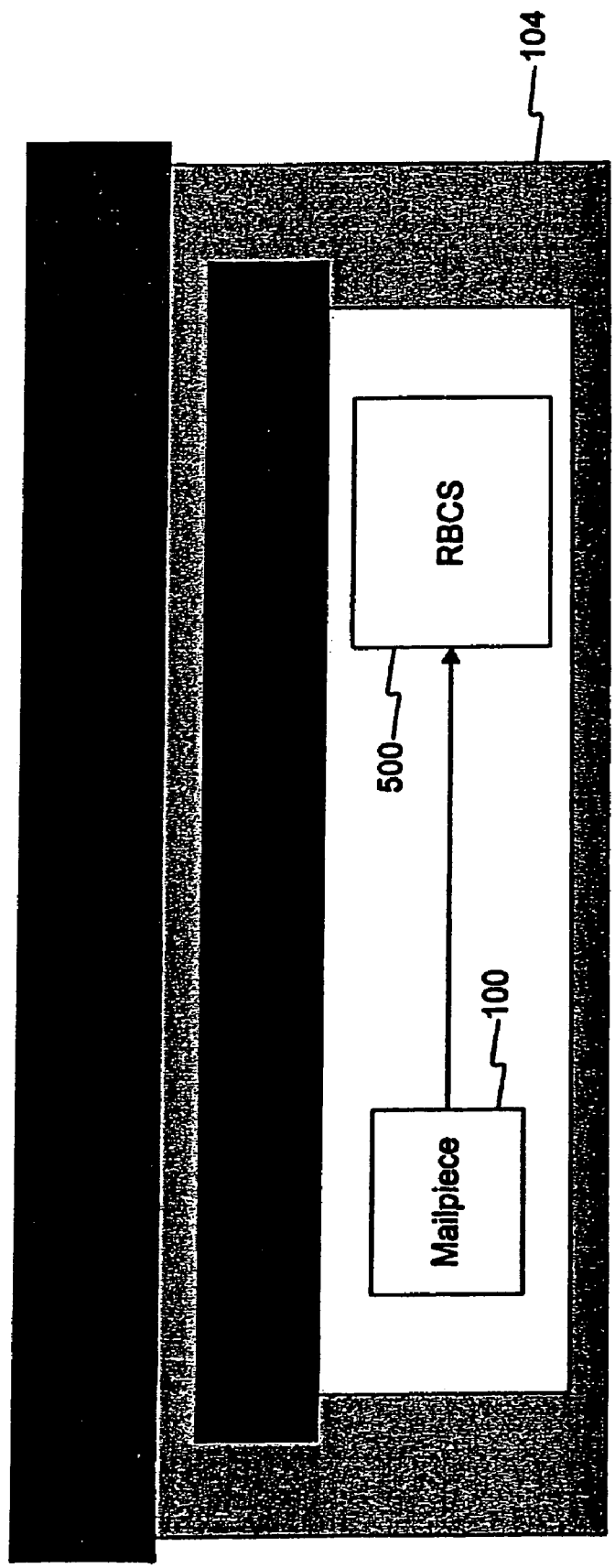
FIG. 4A depicts a simplified overview of a mailpiece as it enters a Post Office in a Remote Bar Code System (RBGS)

FIG. 4A depicts a simplified overview of a mailpiece as it enters a Post Office in a Remote Bar Code System (RBCS). As shown in FIG. 4A, mailpiece 100 enters a RBCS 500 for identification and processing to a destination address. In RBCS 500, mailpiece 100 can be identified by POSTNET code 202, which represents the ZIP code of the destination address, or ID Tag 204, which is stored temporarily within RBCS 500 during the initial identification and processing, as an identification code. RBCS 500 actually applies both POSTNET code 202 and ID Tag 204 to mailpiece 100. RBCS 500 first marks mailpiece 100 with ID Tag 204, and then RBCS 500 marks mailpiece 100 with POSTNET code 202. Then, after mailpiece 100 has been marked with POSTNET code 202 by RBCS 500, mailpiece 100 is then sorted in RBCS 500 based on POSTNET code 202, provided POSTNET code 202 is legible.

In RBCS 500, if POSTNET code 202 is not legible, RBCS 500 may use a special machine or a manual process to identify and process mailpiece 100 to a destination address. To use the special machine (described in detail herein), RBCS 500 may identify and process mailpiece 100 based on ID Tag 204. If ID Tag 204 is legible to this special machine, RBCS 500 can obtain POSTNET code 202 from a temporary database and thereby identify and continue to process mailpiece 100 to the destination address. Specifically, if this occurs, RBCS 500 reapplies POSTNET code 202 to mailpiece 100 and then again attempts to identify and process mailpiece 100 to the destination address. Notably, once mailpiece 100 leaves RBCS 500, ID Tag 204 is no longer stored within RBCS 500. Therefore, once mailpiece 100 has been marked with POSTNET code 202 (and has been verified by RBCS 500), ID Tag 204 can no longer be used to identify mailpiece 100.

2. Overview of ICS

Figure 4B:
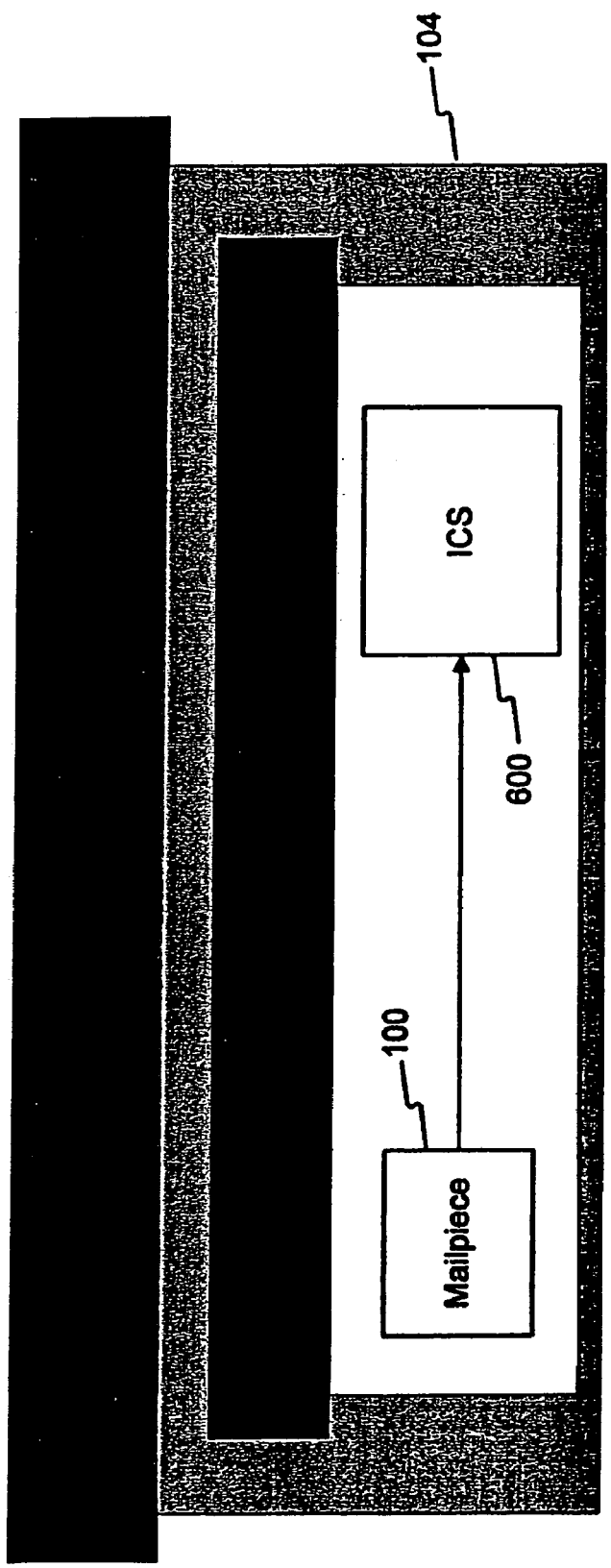
FIG. 4B depicts a simplified overview of a mailpiece as it enters a Post Office in an Identification Code Sorting (ICS) system.

FIG. 4B depicts a simplified overview of a mailpiece as it enters a Post Office in an Identification Code Sorting (ICS) system. As shown in FIG. 4B, mailpiece 100 enters an ICS system 600 for identification and processing to a destination address, like mailpiece 100 enters RBCS 500. In addition, in ICS system 600, mailpiece 100 can be identified by POSTNET code 202 and ID Tag 204, and ICS system 600 applies both POSTNET code 202 and ID Tag 204 to mailpiece 100. And, mailpiece 100 is also sorted by ICS system 600 based on POSTNET code 202, once ICS system 600 has marked mailpiece 100 with POSTNET code 202. However, in contrast to RBCS 500, ID Tag 204 can be used in ICS system 600 at any time during the processing of mailpiece 100 from Post Office 104 to the destination address.

Consistent with one embodiment of the present invention, ICS system 600 utilizes computer hardware and software to maintain a long-term database for a plurality of ID Tags 204. In ICS system 600, if POSTNET code 202 becomes illegible, ID Tag 204 provides a source by which mailpiece 100 can be automatically identified and processed in ICS system 600 throughout the entire mail identification and processing system, whereby ICS system 600 references a long-term database stored within ICS system 600. In addition, ICS system 600 also enables many advanced processing capabilities based on ID Tag 204, including, for example, redundant ZIP code confirmation.

3. Detailed Description of RBCS

Figure 5:
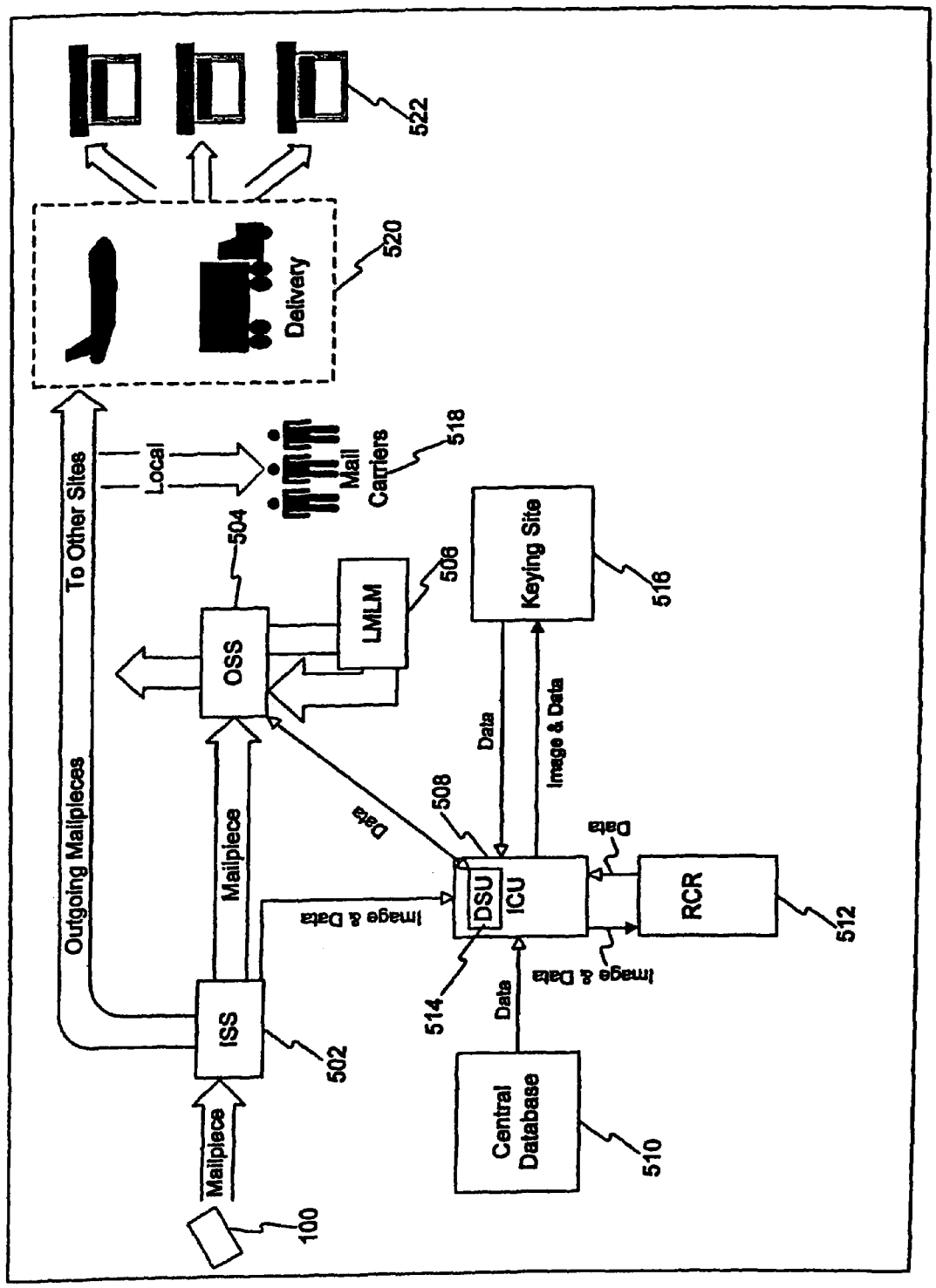
FIG. 5 shows one embodiment of a Remote Bar Code System (RBCS), as shown in FIGS. 2A and 4A.

FIG. 5 shows one embodiment of a Remote Bar Code System (RBCS), as shown in FIGS. 2A and 4A. When mailpiece 100 with destination address 200 enters Post Office 104 using RBCS 500, as shown in FIGS. 2A and 4A, processing begins at an Input Subsystem (ISS) 502. A piece of equipment at ISS 502, such as a MultiLine Optical Character Reader Input Subsystem, sprays (i.e., prints) ID Tag 204 onto the back of mailpiece 100 using, for example, fluorescent ink. ISS 502 also takes an image of mailpiece 100 (e.g., a digital image) and attempts to resolve the ZIP code portion of destination address 200, that is, ISS 502 attempts to determine POSTNET code 202 in sufficient detail to enable delivery of mailpiece 100 to destination address 200. Sufficient detail may be, for example, a ZIP code with 5, 9, or 11 digits. If ISS 502 successfully resolves the ZIP code portion of destination address 200, ISS 502 then also sprays POSTNET code 202 corresponding to destination address 200 onto the front of mailpiece 100, for example, using nonfluorescent ink. Once RBCS 500 has affixed ID Tag 204 and POSTNET code 202 to mailpiece 100, ISS 502 then sends the POSTNET code information from POSTNET code 202 and the ID Tag information from ID Tag 204 to Image Control Unit (ICU) 508, where the POSTNET code information from POSTNET code 202 and the ID Tag information from ID Tag 204 is stored in Decision Storage Unit (DSU) 514.

If ISS 502 can resolve the ZIP code from destination address 200, and obtain POSTNET code 202 on mailpiece 100, ISS 502 then verifies POSTNET code 202 to confirm that POSTNET code 202 is legible. POSTNET code 202 may not be legible and may result in a verify error, if, for instance, mailpiece 100 is a color other than white or has a pattern that obscures POSTNET code 202. If ISS 502 cannot verify POSTNET code 202, mailpiece 100 is sent to an Output Subsystem 504 and marked for processing by a Letter Mail Labeling Machine (LMLM) 506. At LMLM 506, a white label is applied over the illegible POSTNET code, and mailpiece 100 is manually fed into OSS 504. The white label creates a clear area on mailpiece 100, and RBCS 500 then reapplies POSTNET code 202 onto the while label on mailpiece 100. OSS 504 then verifies POSTNET code 202 to confirm that POSTNET code 202 is legible. Once POSTNET code 202 is verified, ID Tag 204 has no further use.

If ISS 502 cannot resolve the ZIP code from destination address 200, then the mailpiece image, including ID Tag 204, is sent from ISS 502 to an Image Control Unit (ICU) 508. ICU 508 receives delivery address data from a Central Database 510 and forwards the data along with the mailpiece image, including ID Tag 204, to a Remote Computer Reader (RCR) 512. This delivery address data may include ZIP code data, POSTNET data, or temporary ID Tag files, as described in more detail herein. RCR 512 first attempts to use the data from the central database to automatically resolve the ZIP code corresponding to mailpiece 100. For example, RCR 512 uses ID Tag 204 to determine if there is a temporary file on mailpiece 100 in RBCS 500, which contains the ZIP code data. If RCR 512 is successful, it returns the ZIP code data to ICU 508, where the data is stored in a Decision Storage Unit (DSU) 514. If RCR 512 does not successfully resolve the ZIP code corresponding to mailpiece 100, the mailpiece image, including ID Tag 204, is sent from ICU 508 to a Keying Site 516, where a human operator views the mailpiece image and keys in the ZIP code data, which is returned to ICU 508 and stored in DSU 514. Therefore, in RBCS 500, regardless whether RCR 512 or Keying Site 516 resolves the ZIP code data, the ZIP code data, in the form of POSTNET code 202, is linked to ID Tag 204. All of this information, which is identified by ID Tag 204, is temporarily stored in DSU 514.

If ISS 502 cannot resolve the ZIP code from destination address 200, and while the mailpiece image is processed by ICU 508, mailpiece 100 is routed from ISS 502 to an Output Subsystem (OSS) 504. A Bar Code Sorter at OSS 504 reads ID Tag 204 from mailpiece 100 and transmits a lookup request to DSU 514. Once the ZIP code has been resolved for mailpiece 100, DSU 514 then retrieves and returns the ZIP code corresponding to ID Tag 204 to OSS 504, and OSS 504 then applies POSTNET code 202 to mailpiece 100, if necessary. OSS 504 then verifies POSTNET code 202 to confirm that POSTNET code 202 is legible. If OSS 504 cannot verify POSTNET code 202, mailpiece 100 is sent to LMLM 506 for manual processing as described above. OSS 504 then resprays and verifies POSTNET code 202 to confirm that POSTNET code 202 is legible. Once POSTNET code 202 is verified, ID Tag 204 has no further use and is no longer stored in RBCS 500.

After mailpiece 100 is processed by ISS 502 and OSS 504, initial mail processing of mailpiece 100 by RBCS 500 is complete at Post Office 104. If destination address 200 of mailpiece 100 indicates that mailpiece 100 is local mail, then RBCS 500 directs mailpiece 100 to mail carriers 518. However, if destination address 200 indicates that mailpiece 100 is not local mail, then RBCS 500 dispatches mailpiece 100 via one or more modes of transportation 520 to remote delivery sites 522.

4. Detailed Description of ICS

Figure 6A:
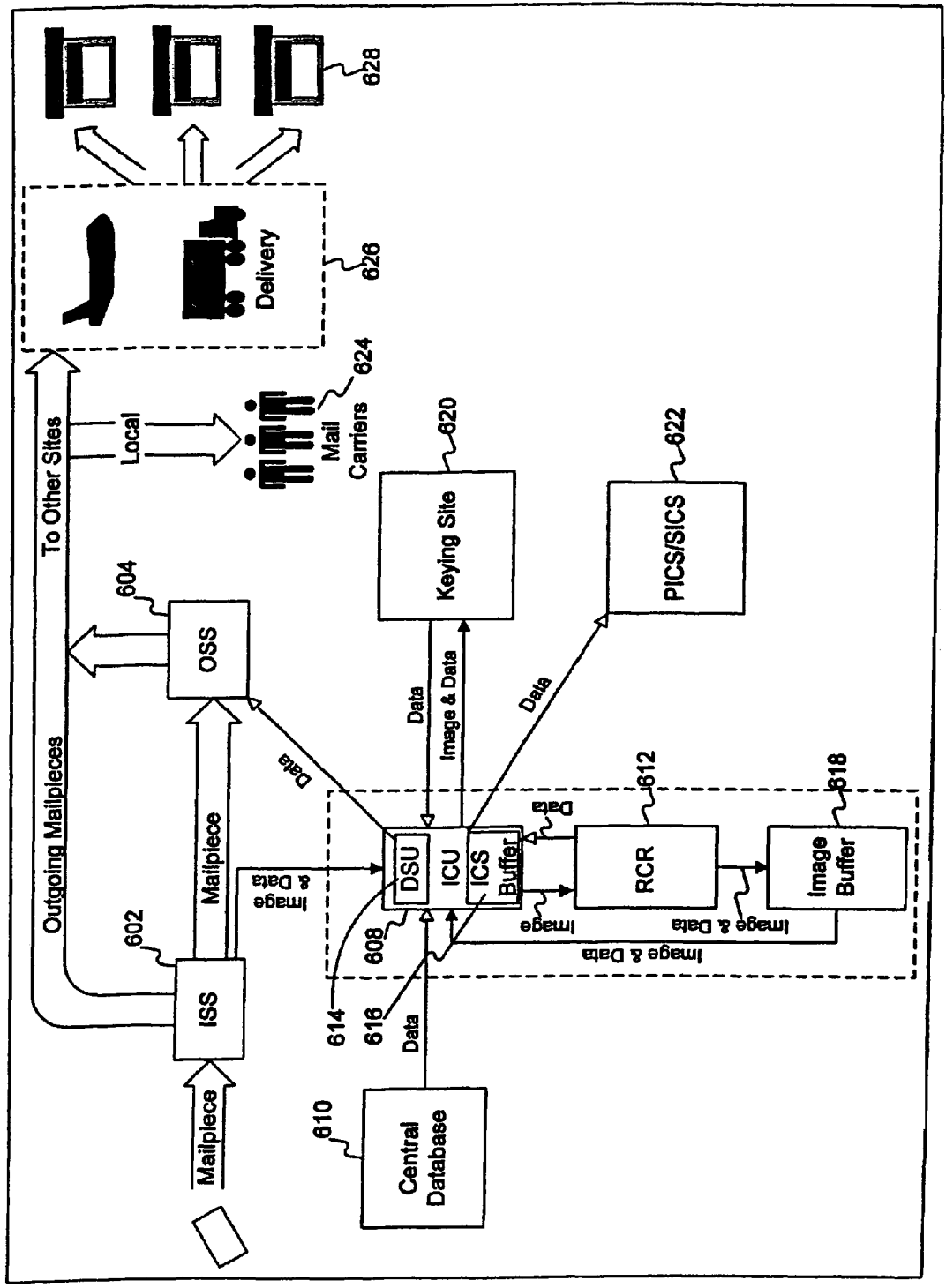
FIG. 6A shows one embodiment of an Identification Code Sorting (ICS) system, as shown in FIGS. 2A and 4B.

FIG. 6A shows one embodiment of an Identification Code Sorting (ICS) system, as shown in FIGS. 2A and 4B. When mailpiece 100 enters Post Office 104 using ICS system 600, as shown in FIGS. 2A and 4B, processing begins at an ISS 602. A piece of equipment at ISS 602, such as a MultiLine Optical Character Reader Input Subsystem, sprays ID Tag 204 onto the back of mailpiece 100, for example, using fluorescent ink. ISS 602 also takes an image (e.g., a digital image) of mailpiece 100 and attempts to resolve the ZIP code portion of destination address 200. If ISS 602 successfully resolves the ZIP code portion of destination address 200, ISS 602 then sprays POSTNET code 202 corresponding to destination address 200 onto the front of mailpiece 100, for example, using nonfluorescent ink. Once ICS system 600 has affixed ID Tag 204 and POSTNET code 202 to mailpiece 100, ISS 602 then sends the POSTNET code information from POSTNET code 202 and ID Tag information from ID Tag 204 to ICU 608, where the POSTNET code information from POSTNET code 202 and the ID Tag information from ID Tag 204 is stored in DSU 614 and ICS Buffer 616.

If ISS 602 can resolve the ZIP code from destination address 200 and obtain POSTNET code 202 on mailpiece 100, ISS 602 then verifies POSTNET code 202. This may result in a verify error if, for instance, mailpiece 100 is a color other than white or has a pattern that obscures POSTNET code 202. If ISS 602 cannot verify POSTNET code 202, mailpiece 100 is sent to an Output Subsystem (OSS) 604. OSS 604 determines whether mailpiece 100 is bound for an ICS-enabled destination. If mailpiece 100 is bound for an ICS-enabled destination, then mailpiece 100 stays within ICS system 600 and does not require initial manual intervention. Therefore, in contrast to RBCS 500, a letter mail labeling machine is not necessary in ICS system 600. However, if mailpiece 100 is not bound for an ICS-enabled destination, then mailpiece 100 is processed as in RBCS 500, as described above.

If ISS 602 cannot verify POSTNET code 202, ISS 602 may attempt to resolve the ZIP code from destination address 200 on mailpiece 100. If ISS 602 cannot resolve the ZIP code from destination address 200, then the mailpiece image, including ID Tag 204, is sent from ISS 602 to an Image Control Unit (ICU) 608. ICU 608 receives delivery address data from a Central Database 610 and forwards the data along with the mailpiece image, including ID Tag 204, to a Remote Computer Reader (RCR) 612. This delivery address data may include ZIP code data, POSTNET data, and/or ID Tag files, as described in more detail herein. RCR 612 first attempts to use the data from the central database to automatically resolve the ZIP code corresponding to mailpiece 100. For example, RCR 612 uses ID Tag 204 to determine if there is a file on mailpiece 100 in ICS system 600, which contains the ZIP code data. There should be a file for each mailpiece 100, so there should be a file in ICS system 600, which allows the ZIP code for mailpiece 100 to be resolved automatically by ICS system 600 without any human intervention. If RCR 612 is successful, it returns the ZIP code data to ICU 608, where the data is stored in a Decision Storage Unit (DSU) 614 and an ICS Buffer 616. If RCR 612 does not successfully resolve the ZIP code corresponding to mailpiece 100, then mailpiece 100 is processed as in RBCS 500, as described above. Also, if RCR 612 is not successful, ICS system 600 may use an Image Buffer 618 for priority designation, as described in more detail herein.

If ISS 602 cannot resolve the ZIP code from destination address 200, and while the mailpiece image is processed by ICU 608, mailpiece 100 is routed from ISS 602 to OSS 604. A Bar Code Sorter at OSS 604 reads ID Tag 204 from mailpiece 100 and transmits a lookup request to DSU 614. Once the ZIP code has been resolved for mailpiece 100, DSU 614 then retrieves and returns the ZIP code corresponding to ID Tag 204 to OSS 604, and OSS 604 then applies POSTNET code 202 to mailpiece 100, if necessary. OSS 604 then verifies POSTNET code 202 to confirm that POSTNET code 202 is legible. However, in contrast to RBCS 500, even if OSS 604 cannot verify POSTNET code 202, mailpiece 100 can still be identified and processed in ICS system 600, if OSS 604 determines that mailpiece 100 is bound for an ICS-enabled destination. In this scenario, ICS system 600 simply uses ID Tag 204 as the identification code (instead of POSTNET code 202).

Therefore, in contrast to RBCS 500, ICS system 600 provides for the long-term storage of ID Tags 204 and corresponding POSTNET codes 202, which allows for the automation of tasks previously required to be performed by human operators. In addition, ICS system 600 provides for the sharing of this information throughout all phases of the identification and processing of mailpiece 100. This capability is made possible by Primary Identification Code Server/Secondary Identification Code Server (PICS/SICS) system 622. As described below, PICS/SICS system 622 enables downstream mailpiece identification and processing based on ID Tag 204, even if POSTNET code 202 becomes illegible. As in RBCS 500, after mailpiece 100 is processed by ISS 602 and OSS 604 in ICS system 600, initial mail processing is complete. Thereafter, mailpiece 100 is processed as in RBCS 500, a described above.

Figure 6B:
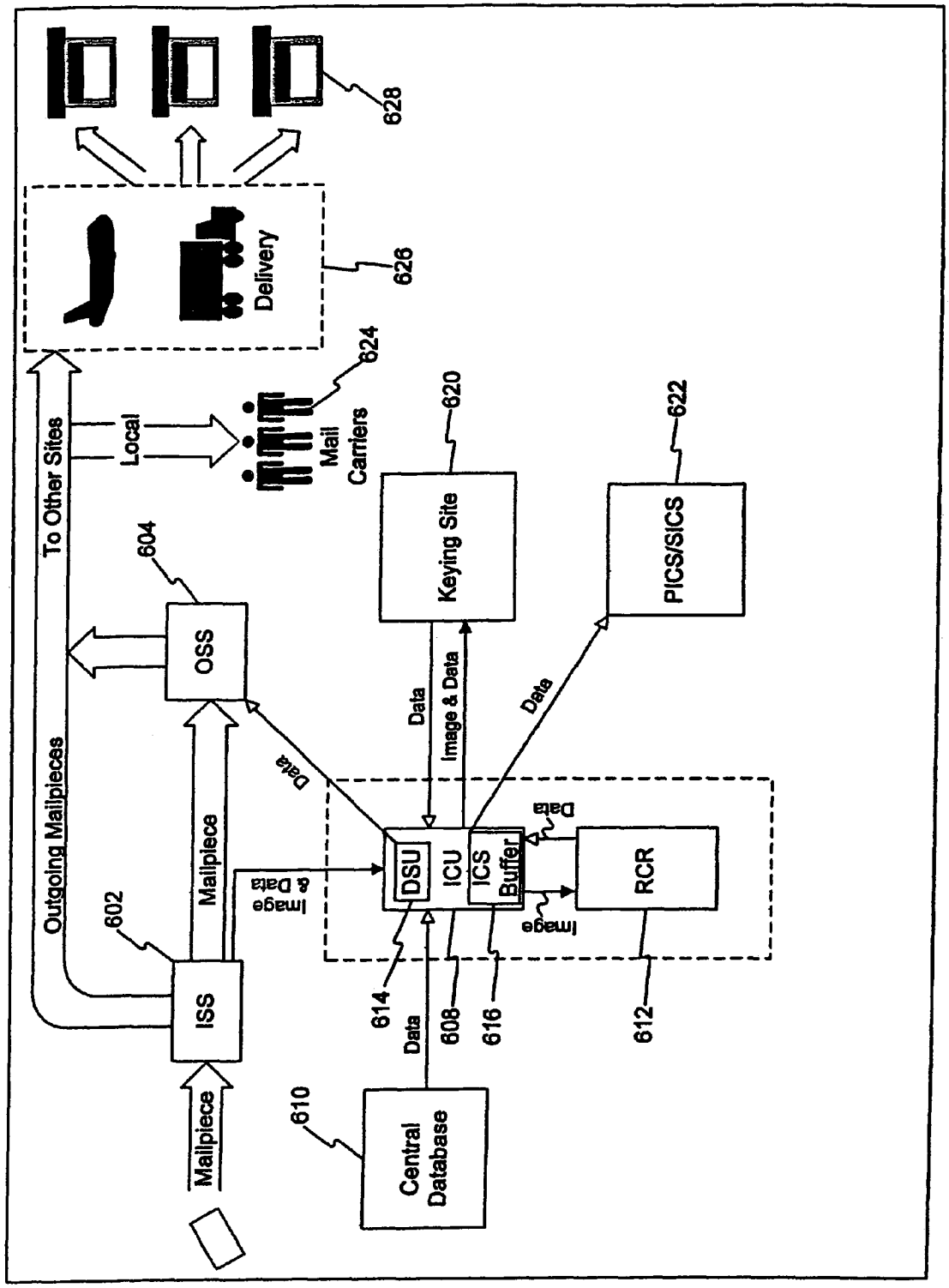
FIG. 6B shows an alternative embodiment of an Identification Code Sorting (ICS) system, as shown in FIGS. 2A and 4B.

FIG. 6B shows an alternative embodiment of an Identification Code Sorting (ICS) system, as shown in FIGS. 2A and 4B. In this embodiment, if RCR 612 does not successfully resolve the ZIP code corresponding to mailpiece 100, the mailpiece image is not stored in an image buffer (e.g., Image Buffer 618 in FIG. 6A). Instead, RCR 612 sends the mailpiece image to ICU 608 indicating that the ZIP code has not been resolved, and ICU 608 transmits the mailpiece image to Keying Site 620. At Keying Site 620, processing occurs as described above with reference to FIG. 6A.

a. Overview of Processing for Mailpiece Image

Figure 7:
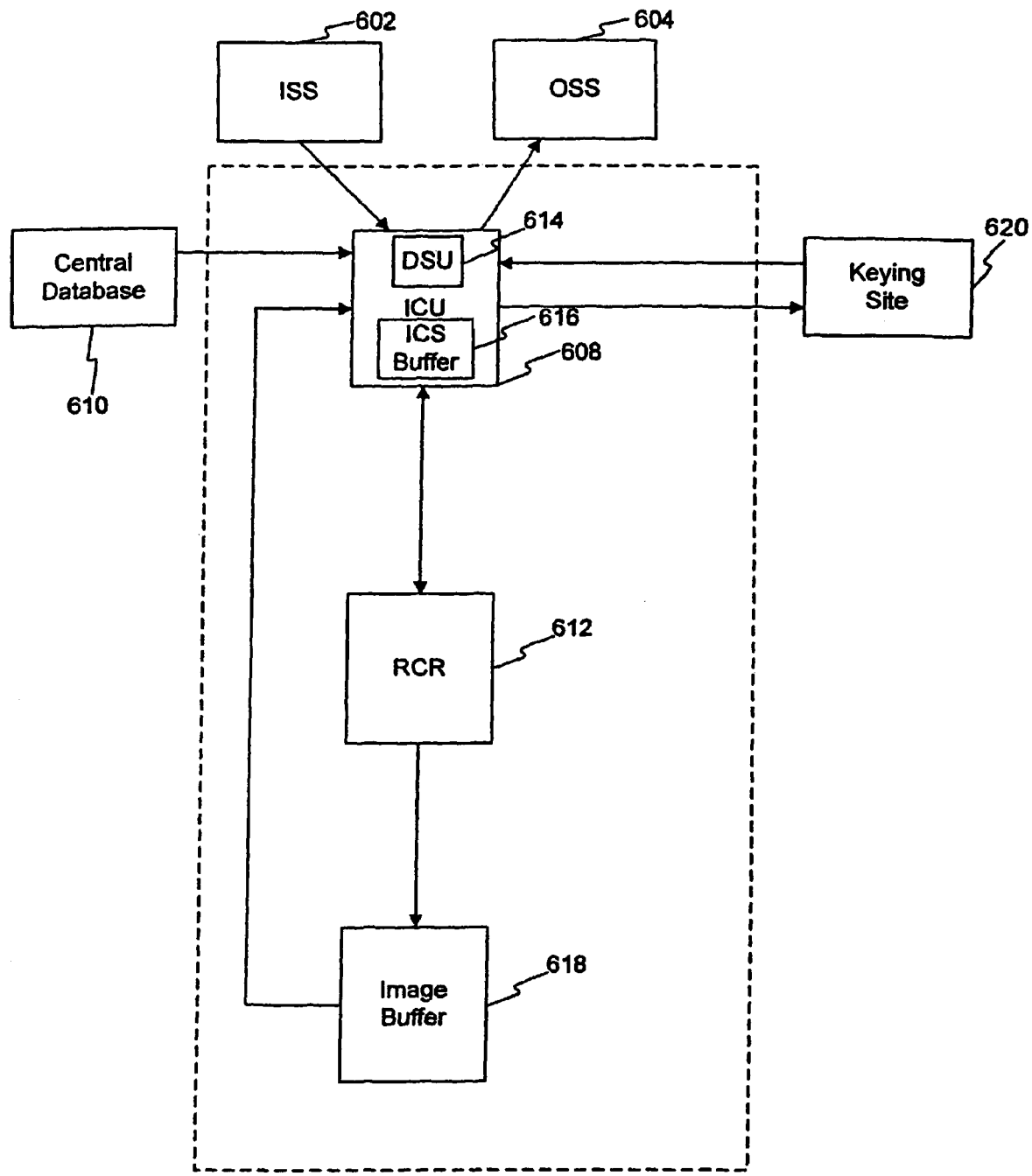
FIG. 7 is a detailed view of one embodiment of the section of an ICS system in which a mailpiece image (including an ID Tag) is processed to determine a POSTNET code (or ZIP code) corresponding to the destination address of a mailpiece, as shown in FIG. 6A.

FIG. 7 is a detailed view of one embodiment of the section of an ICS system in which a mailpiece image (including an ID Tag) is processed to determine a POSTNET code (or ZIP code) corresponding to the destination address of a mailpiece, as shown in FIG. 6A. The mailpiece image (along with ID Tag 204), taken at ISS 602, is passed from ISS 602 to ICU 608 for processing. From ICU 608, the mailpiece image (and ID Tag 204) is passed to RCR 612. Also, Central Database 610 (e.g., a USPS master address database) passes data (e.g., POSTNET data and/or ZIP code data) via ICU 608 to RCR 612. RCR 612 processes the mailpiece image to resolve ZIP code data using the data received from Central Database 610. Generally, RCR 612 is able to resolve ZIP code data based on a file contained within Central Database 610—the file is identified by ID Tag 204. In effect, ID Tag 204 is used to match the mailpiece image to a file in Central Database 610. In ICS system 600, in contrast to RBCS 500, ID Tag 204 may be used to match the proper file in Central Database 610 throughout the identification and processing system.

Nonetheless, if RCR 612 fails, then the mailpiece image (and ID Tag 204) is stored in Image Buffer 618 in one embodiment, as shown in FIG. 6A, which may include a priority designation, and is then sent to Keying Site 620, where it is processed according to the priority designation (if any). In an alternative embodiment without Image Buffer 618, as shown in FIG. 6B, if RCR 612 does not resolve the ZIP code corresponding to mailpiece 100, RCR 612 sends the mailpiece image (and ID Tag 204) to ICU 608 indicating that the ZIP code has not been resolved, and ICU 608 then transmits this data to Keying Site 620.

During the subsequent processing in ICS system 600, when a ZIP code for the mailpiece image is resolved, either by RCR 612 or Keying Site 620, the ZIP code data is returned to ICU 608. ICU 608 then uses the ZIP code data to resolve the ZIP code for mailpiece 100. To do this, DSU 614 in ICU 608 sends the ZIP code data to OSS 604. ICU 608 also saves the ZIP code data in a storage system. ICU 608 informs Central Database 610 of the ZIP code data, which is mapped to ID Tag 204, which maintains a long-term storage capability. ICU 608 may also retain a local copy of the ZIP code data, which is mapped to ID Tag 204, at Image Buffer 618. As a result, ICS system 600 retains the ability to identify and process mailpiece 100 automatically throughout the delivery stages in a mail sorting system.

b. Detailed Description of Processing for Mailpiece Image

Figure 8:
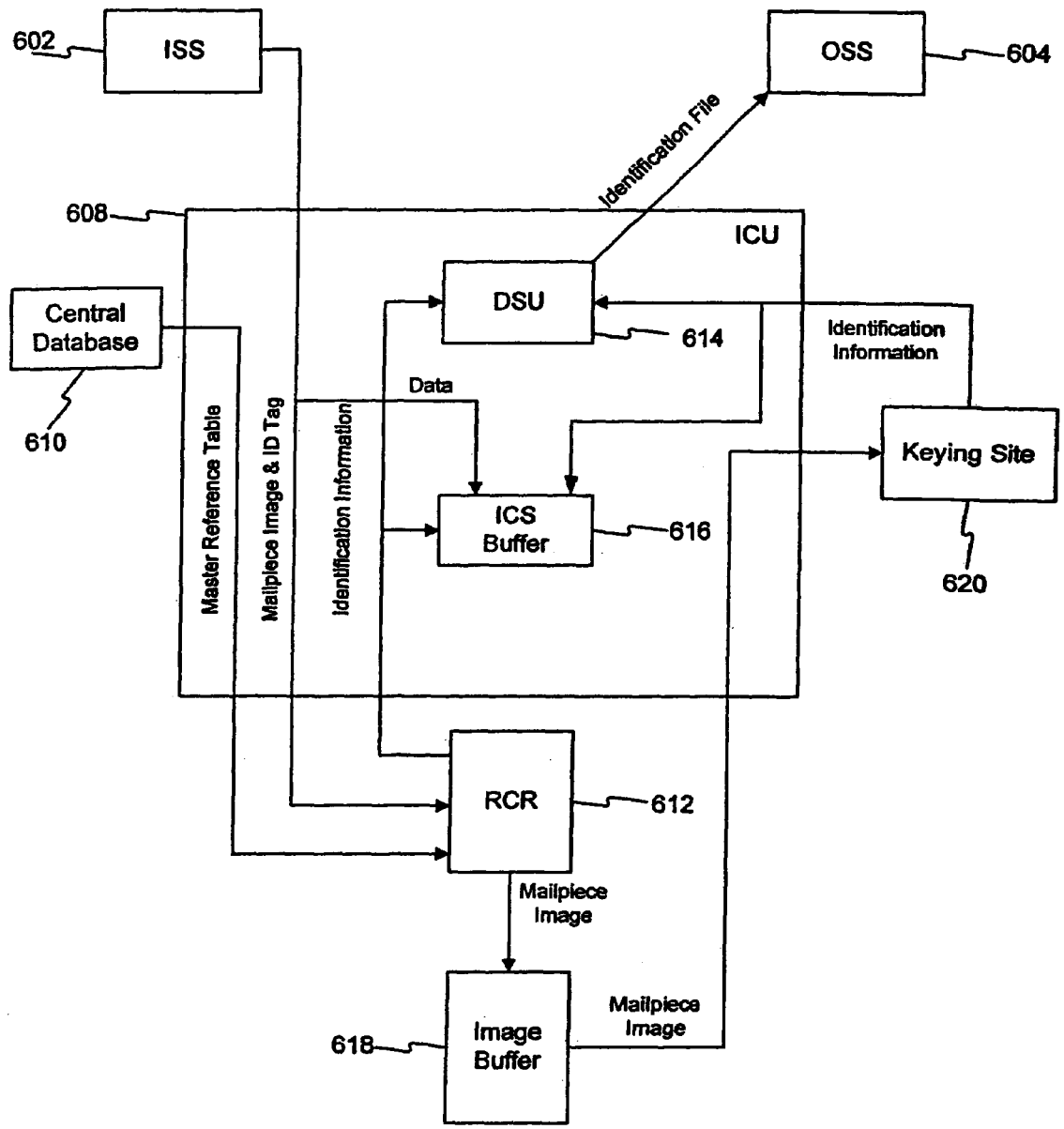
FIG. 8 is a block diagram of one embodiment of an Image Control Unit (ICU) in greater detail.

FIG. 8 is a block diagram of one embodiment of an Image Control Unit (ICU) in greater detail. ICU 608 directs the processing of a mailpiece image corresponding to a mailpiece 100 in ICS system 600 to resolve a POSTNET code 202 (or ZIP code data), using ID Tag 204. ICU 608 receives from ISS 602 and stores the mailpiece image and ID Tag 204. ICU 608 also receives data, such as a master reference table, from Central Database 610. Central Database 610 can be, for example, a USPS master address database or a USPS address change service database. Central Database 610 can also contain identification files corresponding to a plurality of ID Tags 204. ICU 608 passes the mailpiece image (including ID Tag 204, not shown) and the master reference table to RCR 612.

Processing by RCR 612 is described below, with reference to FIG. 9. If RCR 612 resolves the identification information, such as, POSTNET code 202 (or ZIP code data) corresponding to the mailpiece image, RCR 612 passes POSTNET code 202 to ICU 608, and POSTNET code 202 is stored along with ID Tag 204 in both DSU 614 and ICS Buffer 616. If RCR 612 does not resolve the identification information, such as, POSTNET code 202, then RCR 612 passes the mailpiece image and ID Tag 204 to Image Buffer 618. Processing by Image Buffer 618 is described below, with reference to FIG. 10. At a particular time, such as, for example, the end of a mail sort run or the end of the day, Image Buffer 618 passes the mailpiece image (and ID Tag 204, not shown) to ICU 608, which passes the mailpiece image to Keying Site 620. Processing by Keying Site 620 is described below, with reference to FIG. 11. Keying Site 620 returns an identification file, including POSTNET code 202, to ICU 608, where it is stored with ID Tag 204 in both DSU 614 and ICS Buffer 616. DSU 614 supplies identification information, such as ID Tag 204 and POSTNET code 202 for mailpiece 100, to OSS 604 during initial mail processing. ICS Buffer 616 retains a copy of this identification information locally for ICS system 600. A copy of ICS Buffer 616 may be sent to Central Database 610 for long-term storage.

Figure 9:
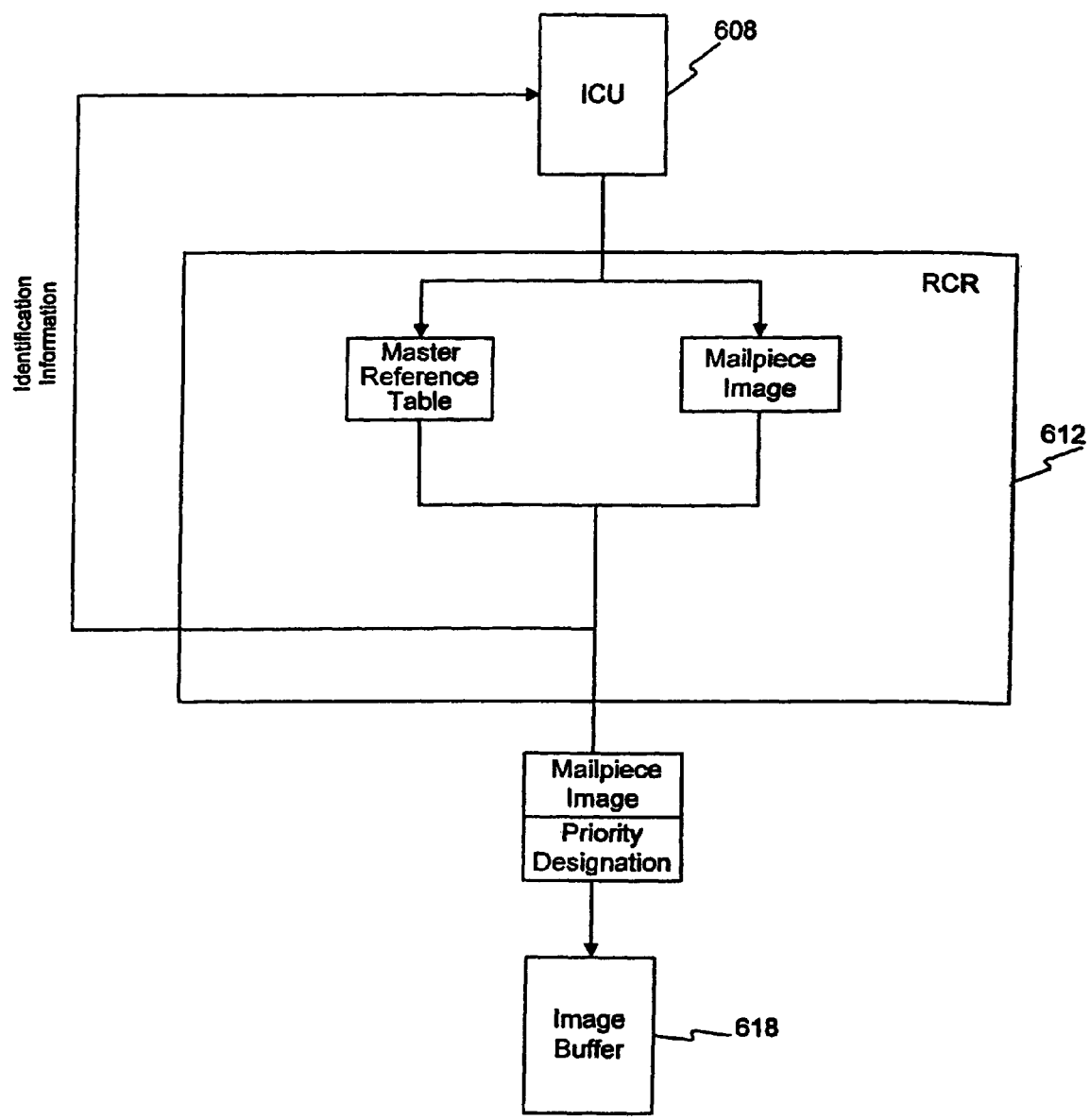
FIG. 9 is a block diagram of one embodiment of a Remote Computer Reader (RCR) in greater detail.

FIG. 9 is a block diagram of one embodiment of a Remote Computer Reader (RCR) in greater detail. RCR 612 receives the mailpiece image (including ID Tag 204, not shown) and the master reference table from ICU 608, as described above with reference to FIG. 8. RCR 612 first attempts to compare the mailpiece image to data in the master reference table to resolve a POSTNET code for the mailpiece (i.e., mailpiece 100) corresponding to the mailpiece image. In doing so, RCR 612 uses ID Tag 204 to determine if there is a file on mailpiece 100, which contains identification information, such as, POSTNET code 202, for mailpiece 100. If RCR 612 succeeds, then RCR 612 sends POSTNET code 202 to ICU 608. If RCR 612 does not resolve the identification information, then, in one embodiment, RCR 612 assigns a priority designation to the mailpiece image and passes the mailpiece image (including ID Tag 204, not shown) and the priority designation to Image Buffer 618. Processing by Image Buffer 618 is described below, with reference to FIG. 10. In an alternative embodiment (not shown), if RCR 612 does not resolve the POSTNET code, RCR 612 can send the mailpiece image or data indicating that the identification information has not been resolved back to ICU 608. Processing by ICU 608 is described above, with reference to FIG. 8.

Figure 10:
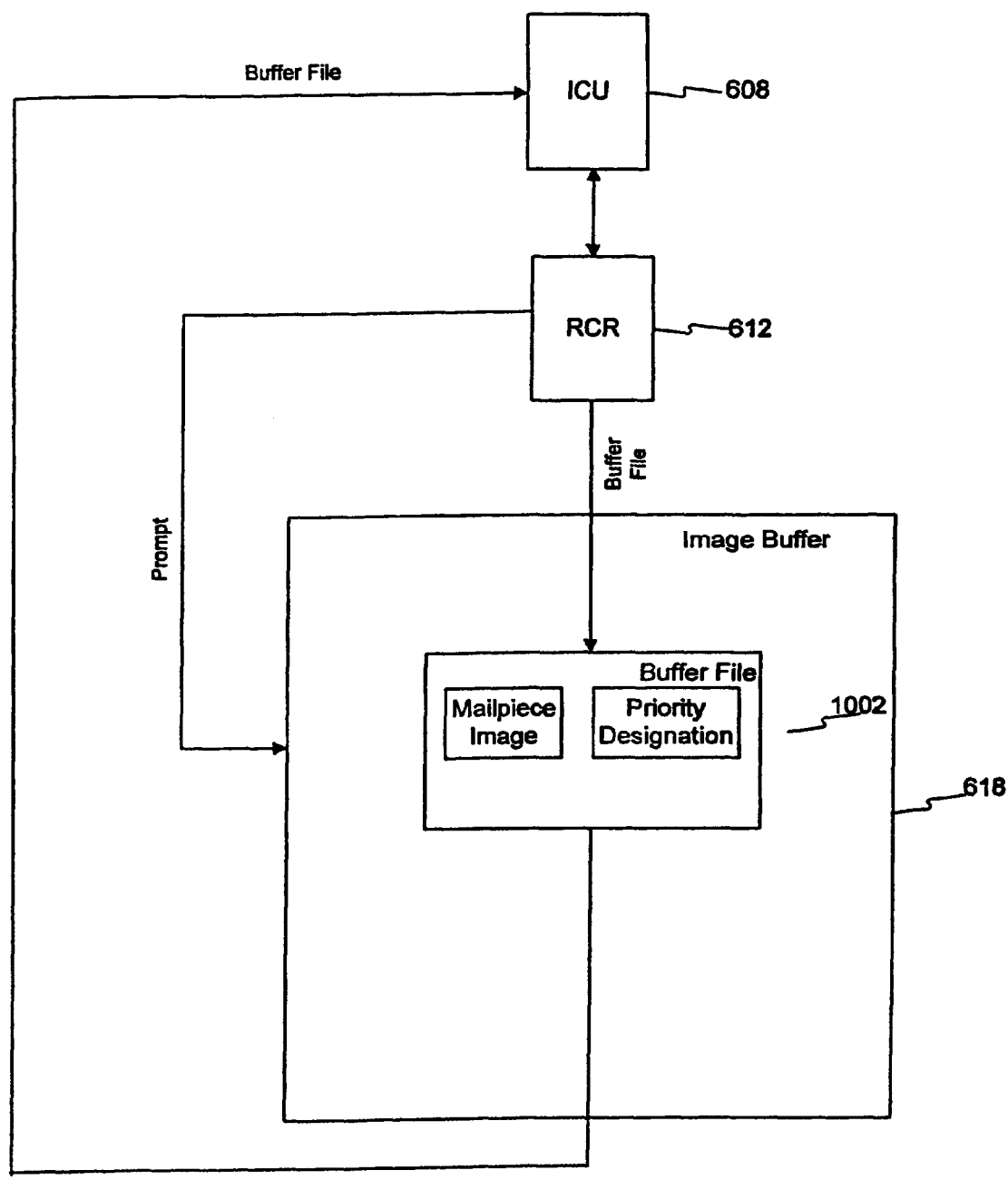
FIG. 10 is a block diagram of one embodiment of an Image Buffer in greater detail.

FIG. 10 is a block diagram of one embodiment of an Image Buffer in greater detail. Image Buffer 618 receives a Buffer File 1002 containing a mailpiece image (including ID Tag 204, not shown) and a priority designation from RCR 612. Image Buffer 618 stores Buffer File 1002. Upon the expiration of a condition (not shown), such as the end of a sort run or the end of the day, or upon receipt of a prompt from (as shown in FIG. 10), for example, RCR 612. Image Buffer 618 sends Buffer File 1002 to ICU 608 for processing. Image Buffer 618 may also retain a copy of the identification information corresponding to a plurality of mailpieces 100 (i.e., a copy of a plurality of Buffer Files 1002). Alternatively, in certain other embodiments of ICS system 600, Image Buffer 618 is not implemented.

Figure 11:
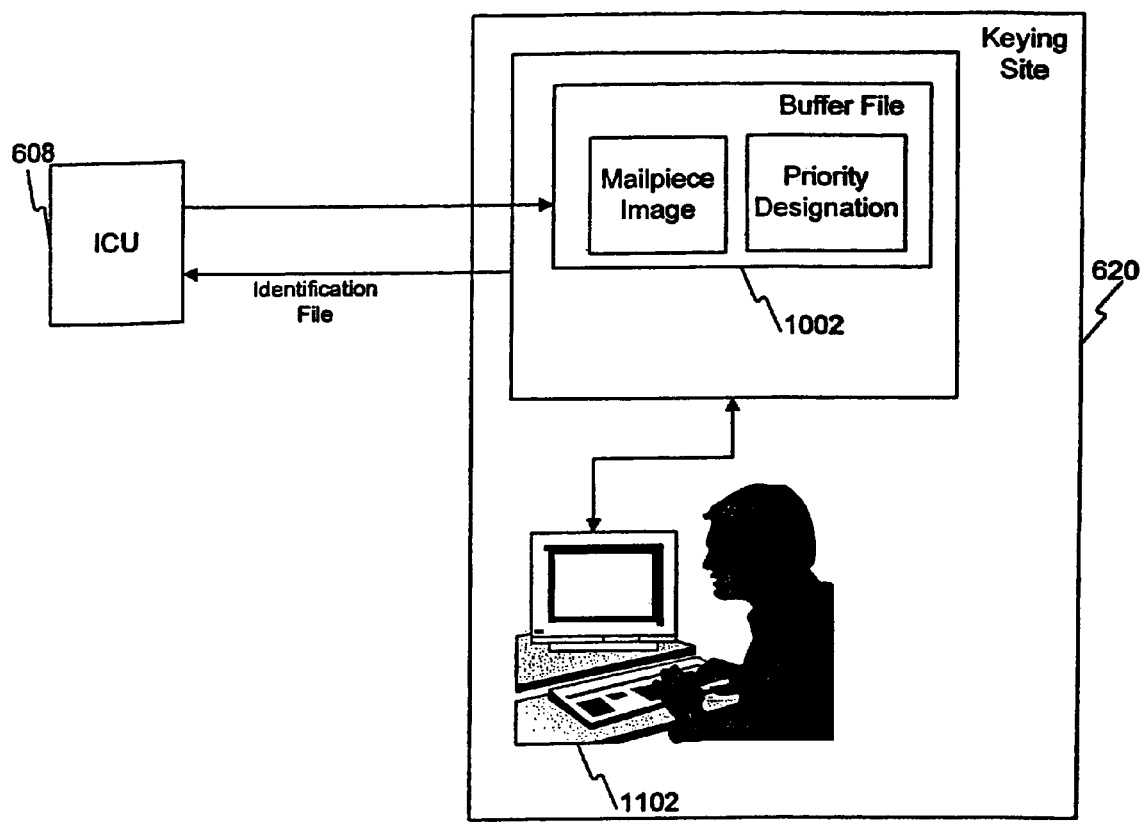
FIG. 11 is a block diagram of one embodiment of a Keying Site in greater detail.

FIG. 11 is a block diagram of one embodiment of a Keying Site in greater detail. In this embodiment, Keying Site 620 receives a Buffer File 1002 from ICU 608 that contains a mailpiece image (including ID Tag 204, not shown) and a corresponding priority designation, which is forwarded to a human operator for manual processing according to the priority designation. As shown in FIG. 11, the mailpiece image from Buffer File 1002 is presented to an operator at a keying station 1102. The operator views the mailpiece image and keys the identification information into a computer at Keying Site 620, such as the ZIP code information for the POSTNET code corresponding to the mailpiece image. Keying Site 620 then returns the identification information to ICU 608 as an identification file. It is to be understood that a priority designation is not necessary. Alternatively, Keying Site 620 could process mailpiece images on a first-received, first-processed basis, if priority designations are not used.

Figure 12:
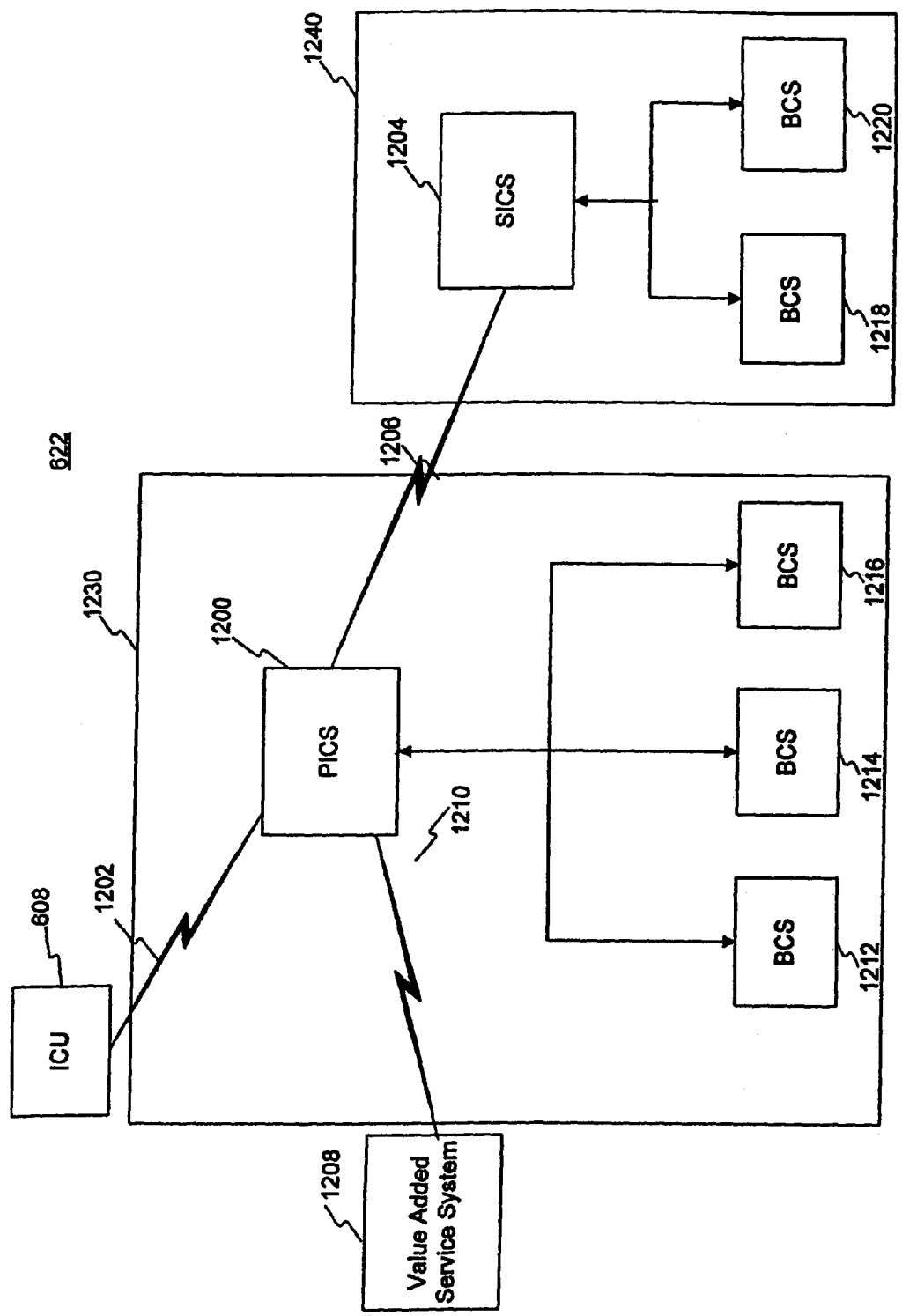
FIG. 12 is a block diagram of one embodiment of a Primary Identification Code Server/Secondary Identification Code Server (PICS/SICS) system, as shown in FIGS. 6A and 6B.

D. Primary Identification Code Server/Secondary Identification Code Server (PICS/SICS) System FIG. 12 is a block diagram of one embodiment of a Primary Identification Code Server/Secondary Identification Code Server (PICS/SICS) system, as shown in FIGS. 6A and 6B. As described above in FIGS. 6A and 6B, ICU 608 maintains ICS Buffer 616, which stores ID Tags and corresponding POSTNET codes for mailpieces. ICU 608 may share this information with PICS/SICS system 622. As shown in FIG. 12, ICU 608 shares identification information with a Primary Identification Code Server (PICS) 1200 via a telecommunications connection 1202. PICS 1200 in turn shares the identification information with a Secondary Identification Code Server (SICS) 1204 via a telecommunications connection 1206.

As shown in FIG. 12, PICS 1200 can also communicate with a Value Added Service System 1208 via telecommunications link 1210. Value Added Service System 1208 can be, for example, a system to track and report the performance of PICS/SICS system 622. Telecommunications connections 1202, 1206, and 1210 can be, for example, an Internet connection, a telephone line with a modem, a local area network (LAN), or a wide area network (WAN). In systems consistent with the present invention, PICS 1200 can communicate with multiple SICS to share a plurality of identification information about a plurality of mailpieces. As also shown in FIG. 12, PICS 1200 communicates with Bar Code Sorters (BCS) 1212, 1214, and 1216. SICS 1204 communicates with BCS 1218 and 1220. Of course, each PICS and SICS can interface with any number of BCS consistent with the present invention. The communication with Bar Code Sorters is described in further detail below, with reference to FIGS. 14 and 15.

Additionally, as shown in FIG. 12, PICS system 1230, which contains PICS 1200 and BCS 1212, 1214, and 1216, is in the same physical location, such as, for example, a USPS Mail Processing & Distribution Center. In one implementation, a dedicated ICS local area network connects BCS 1212, 1214, and 1216 to PICS 1200. SICS system 1240, which contains SICS 1204 and BCS 1218 and 1220, is in a different physical location, such as, for example, a USPS Associate Office. In one implementation, a dedicated ICS local area network connects BCS 1218 and 1220 to SICS 1204. Other configurations of PICS system 1230 and/or SICS system 1240 are possible.

Figure 13:
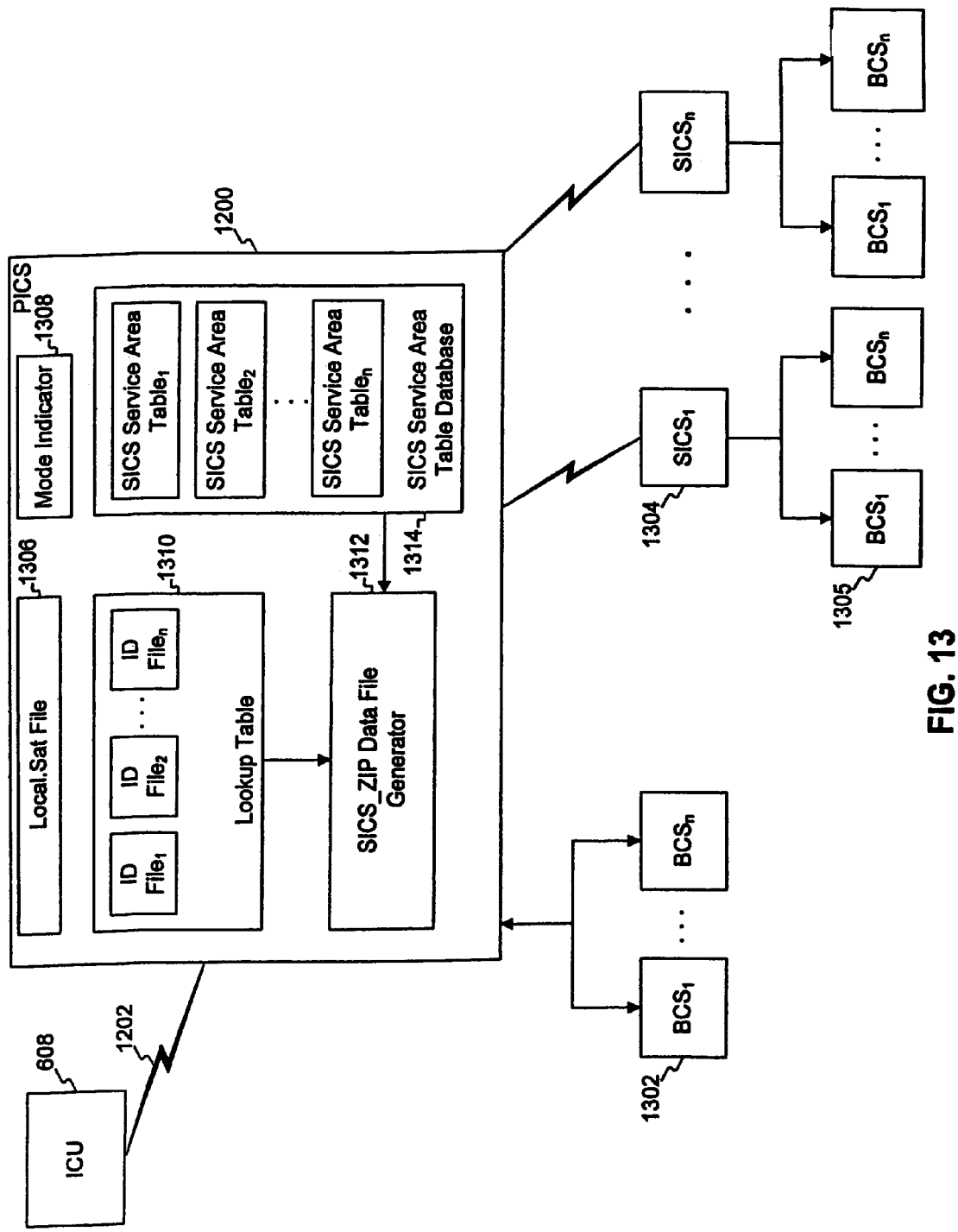
FIG. 13 is a block diagram of one embodiment of a Primary Identification Code Server (PICS), as shown in FIG. 12.

FIG. 13 is a block diagram of one embodiment of a Primary Identification Code Server (PICS), as shown in FIG. 12. As described above, PICS 1200 communicates with ICU 608 via telecommunications connection 1202. In one implementation, PICS 1200 maintains a Local.Sat file 1306 that includes all of the geographic areas, i.e., ZIP code zones, served by PICS 1200. PICS 1200 also includes a Mode Indicator 1308 that can be set to either local or national mode. In local mode, PICS 1200 communicates with one or more Bar Code Sorters (BCS) 1302, one or more Secondary Identification Code Servers (SICS) 1304, and one or more PICS. In national mode, PICS 1200 may additionally communicate with PICS 1200 via one or more Electronic Post Offices (EPOs) (not shown). National mode is described below, with reference to FIGS. 15A and 15B.

As shown in the depicted implementation in FIG. 13, to identify information processed between ICU 608 and PICS 1200, PICS 1200 maintains a Lookup Table 1310. Identification files, or ID files, containing ID Tag and POSTNET data, are stored in the identification files in Lookup Table 1310. To serve one or more SICS 1304, PICS 1200 includes a SICS_ZIP Data File Generator 1312 and a SICS Service Area Table Database 1314. SICS_ZIP Data File Generator 1312 is used by PICS 1200 to create a SICS_ZIP Data File (not shown here, but see below) for each SICS connected to PICS 1200 by matching identification files from Lookup Table 1310 to the service area of each SICS. The service area of each SICS connected to PICS 1200, i.e., the geographic area served by each SICS, is stored in a SICS Service Area Table in SICS Service Area Table Database 1314.

Figure 14:
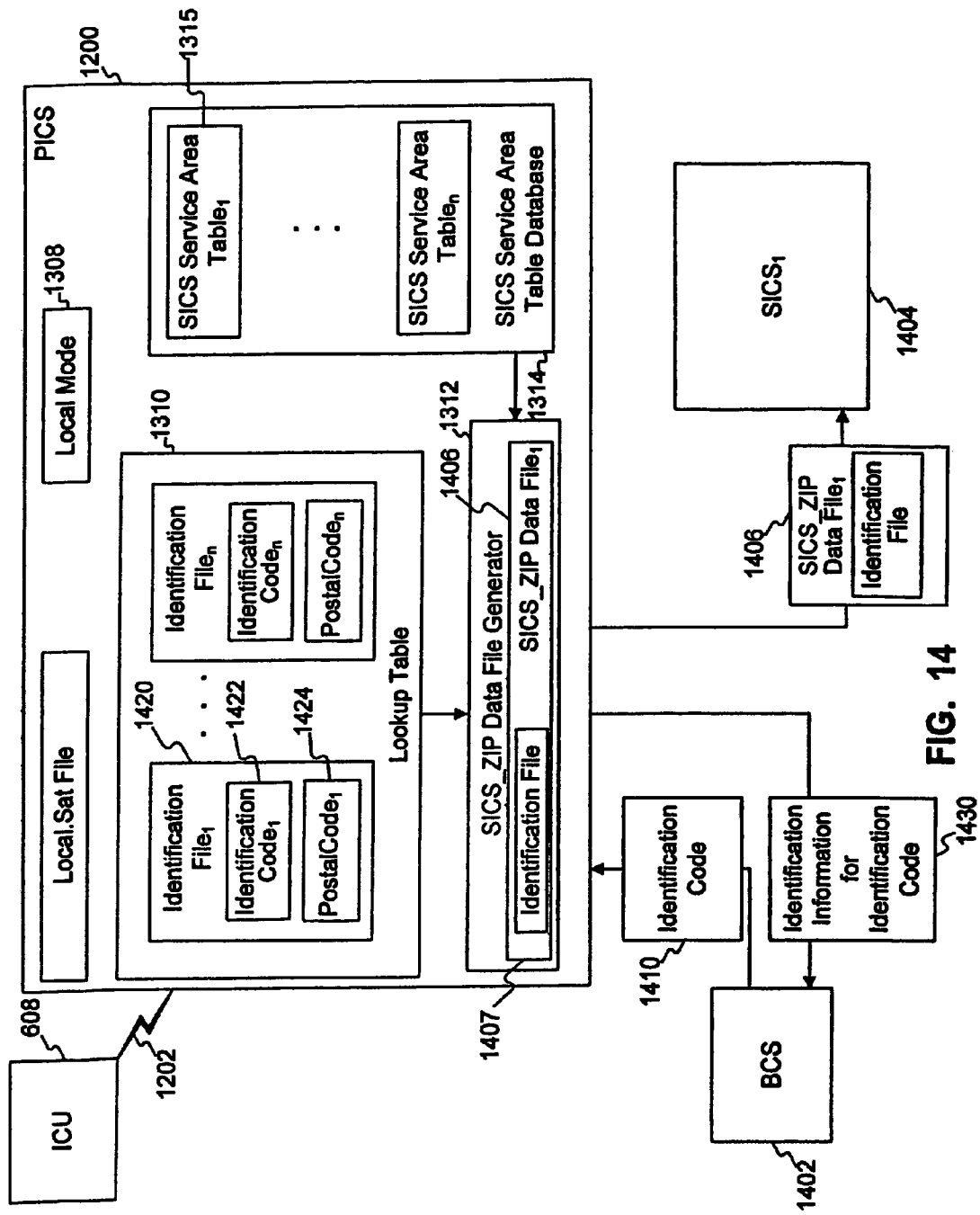
FIG. 14 shows one embodiment of how a PICS functions, as shown in FIG. 13.

FIG. 14 shows one embodiment of how a PICS functions, as shown in FIG. 13. PICS 1200 receives an identification file, including ID Tag 204 and POSTNET code 202, from ICU 608 via telecommunications link 1202. PICS 1200 stores the identification file in Lookup Table 1310. As shown in FIG. 14, each identification file 1420 contains an identification code (ID code) 1422, such as, for example, ID Tag 204, and a postal code 1424, such as, for example, POSTNET code 202. In addition, identification file 1420 can include additional information, such as, for example, an image capture time or status bits indicating various aspects of the identification file. PICS 1200 contains SICS_ZIP Data File Generator 1312. SICS_ZIP Data File Generator 1312 is used by PICS 1200 to create a SICS_ZIP Data File 1406 for each SICS connected to PICS 1200 by matching identification files 1420 from Lookup Table 1310 to the service area of each SICS from SICS Service Area Table Database 1314. PICS 1200 maintains SICS Service Area Table Database 1314, which includes a set of SICS Service Area Tables corresponding to each SICS served by PICS 1200. For example, SICS 1404 would have a corresponding SICS Service Area Table 1315 in SICS Service Area Table Database 1314.

In one implementation of ICS system 600, referring to FIG. 14, PICS 1200 has two functions. A first function of PICS 1200 is to resolve mailpiece information for Bar Code Sorter (BCS) 1402. To do this, BCS 1402 reads an identification code 1410 from a mailpiece and sends the identification code (or ID code or ID Tag) to PICS 1200, such as, for example, via a dedicated ICS local area network (not shown). PICS 1200 looks up identification code 1410 in Lookup Table 1310, and returns identification information, i.e., the ZIP code or the POSTNET code, corresponding to identification code 1410 to BCS 1402.

To do so, PICS 1200 matches identification code 1410 with an identification code contained in an identification file, such as identification code 1422 in identification file 1420. Because ICS system 600 had previously created identification file 1420 corresponding to a single mailpiece (using the unique identification code 1422), PICS 1200 can accurately obtain the identification information using identification file 1420, which matches identification code 1422 to identification code 1410. Thereby, PICS 1200 can also determine that postal code 1424 corresponds to identification code 1410. PICS 1200 then returns identification information 1430 to BCS 1402. In one embodiment, identification information 1430 is postal code 1424. In an alternative embodiment, identification information 1430 is identification code 1422. In another alternative embodiment, identification information 1430 is identification file 1420. In still another alternative embodiment, identification information 1430 can be an entirely different code.

A second function of PICS 1200 is to share information with one or more SICS 1404. To do this, at predetermined intervals, PICS 1200 sends information to SICS 1404 via a telecommunications connection. These intervals can be based on time (e.g., every twenty minutes, every hour, etc.) or on another measurement (e.g., once 20,000 identification files are stored in Lookup Table 1310, etc.). PICS 1200 uses SICS_ZIP Data File Generator 1312 to create a SICS_ZIP Data File 1406. SICS_ZIP Data File 1406 contains the identification files from Lookup Table 1310 for a particular SICS 1404. SICS_ZIP Data File Generator 1312 uses the appropriate SICS Service Area Table 1315 corresponding to SICS 1404 to determine which identification files are included in SICS_ZIP Data File 1406. For example, in SICS Service Area Table Database 1314, there is a SICS Service Area Table 1315 that identifies the service area for a particular SICS, e.g., the ZIP codes for the zones served by SICS 1404. Thus, using this information (for purposes of this example), SICS_ZIP Data File Generator 1312 collects all identification files (e.g., identification files 1407) with the ZIP codes from SICS Service Area Table 1315 and creates SICS_ZIP Data File 1406. At the predetermined interval (described above), PICS 1200 then sends SICS_ZIP Data File 1406 containing identification files 1407 to SICS 1404.

Figure 15:
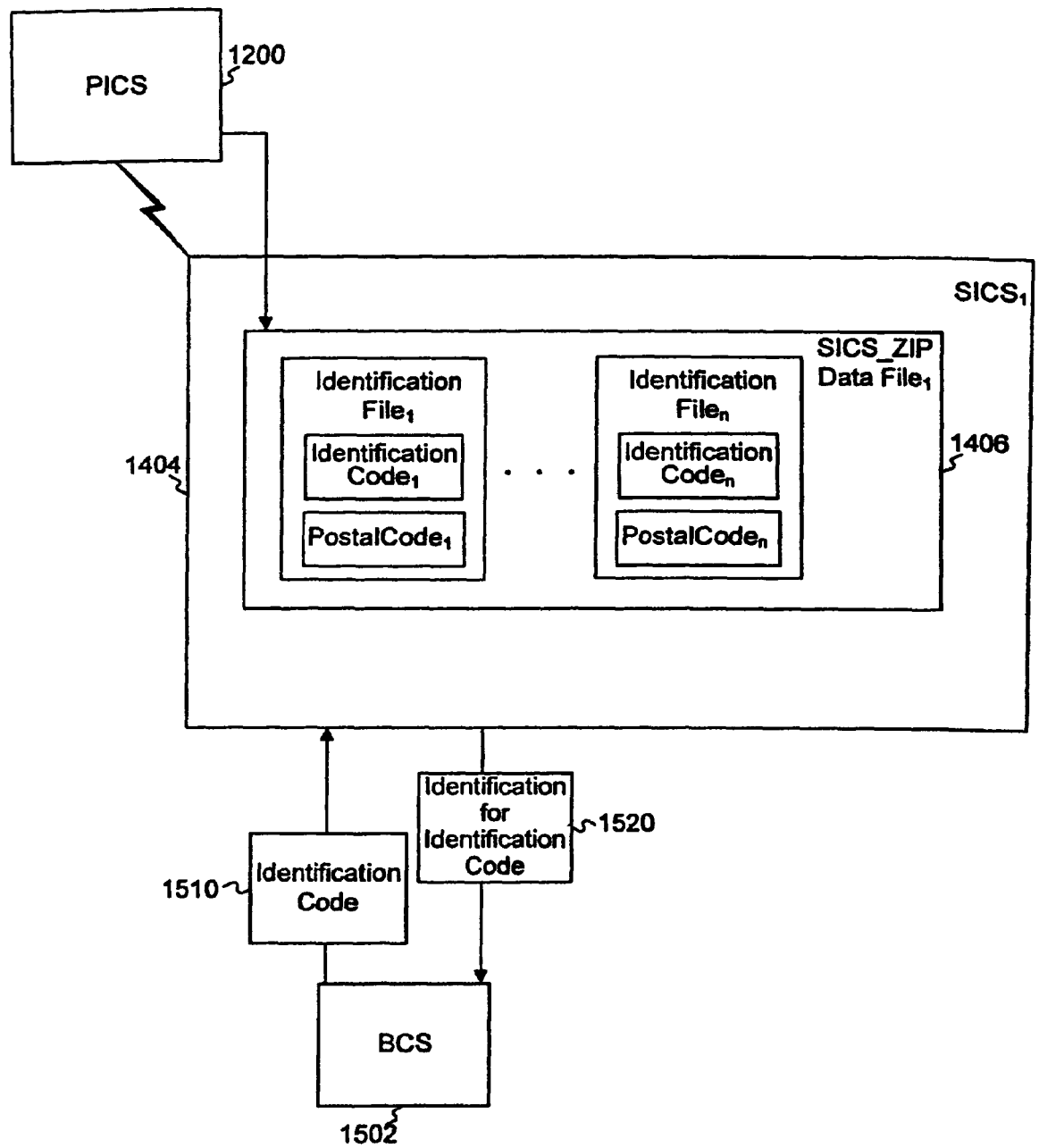
FIG. 15 is a block diagram of one embodiment of a Secondary Identification Code Server (SICS), as shown in FIG. 14.

FIG. 15 is a block diagram of one embodiment of a Secondary Identification Code Server (SICS), as shown in FIG.

14. In FIG. 15, SICS 1404 performs the same basic function as PICS 1200 with respect to Bar Code Sorters. SICS 1404 resolves mailpiece information for one or more Bar Code Sorters, e.g., Bar Code Sorter (BCS) 1502. To do this, SICS 1404 receives a SICS_ZIP Data File 1406 from PICS 1200. For example, SICS_ZIP Data File 1406 may include a collection of identification files 1407 corresponding to mailpieces destined for postal codes within the service area of SICS 1404. In one implementation, when BCS 1502 reads an identification code 1510 from a mailpiece, BCS 1502 sends identification code 1510 to SICS 1404, such as, for example, over a dedicated ICS local area network (not shown). SICS 1404 looks up identification code 1510 in SICS_ZIP Data File 1406 and returns identification information, e.g., the ZIP code or the POSTNET code, to BCS 1502 in the form of identification information 1520. Accordingly, in this implementation, BCS 1502 can use identification information 1520 to identify and process the mailpiece even if the ZIP code or the POSTNET code is illegible. Thus, like PICS 1200, SICS 1404 can determine mailpiece information for a Bar Code Sorter 1502.

Figure 15A:
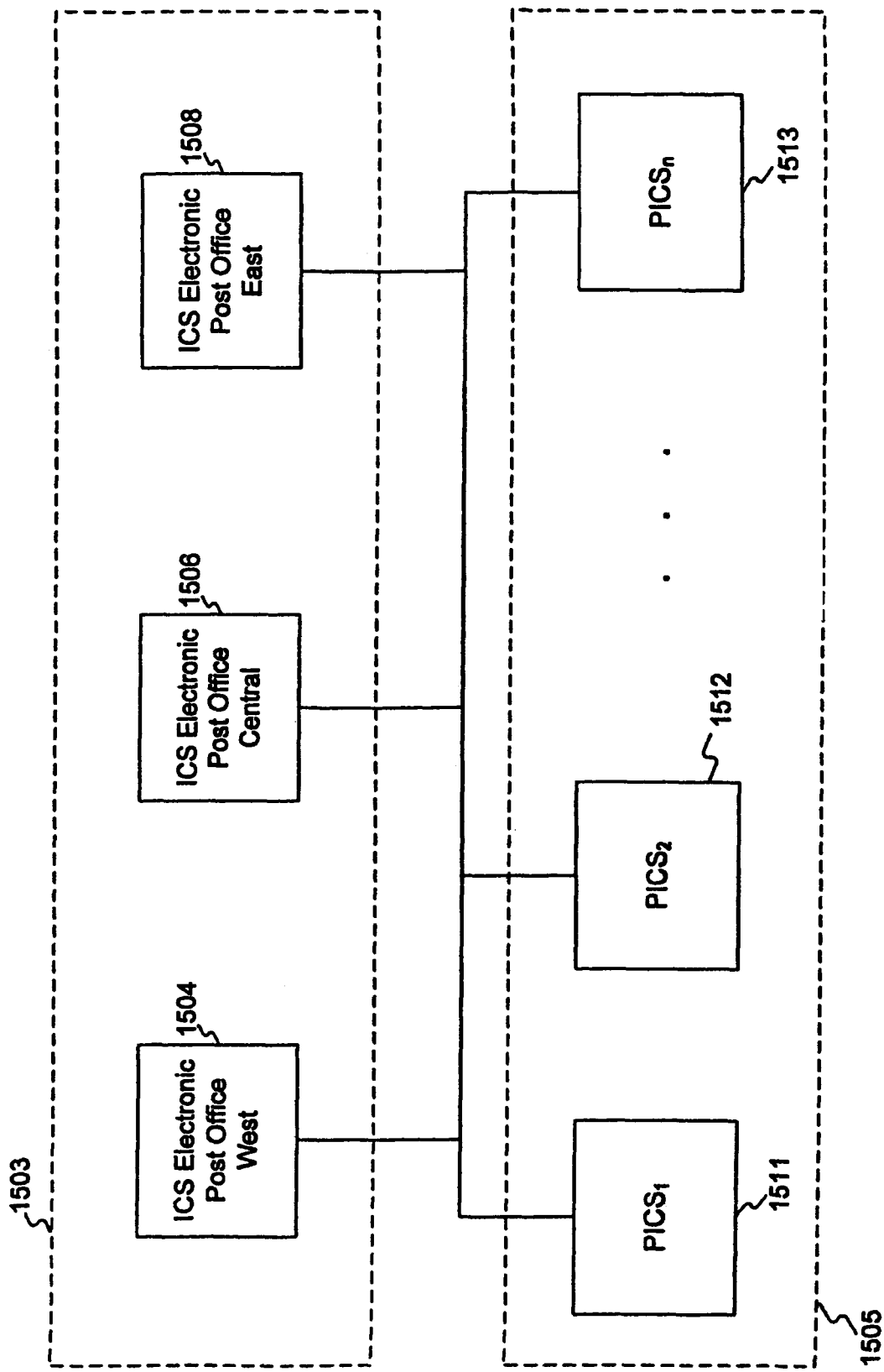
FIG. 15A is a diagram of one embodiment of a plurality of Primary Identification Code Servers operating in national mode.

FIG. 15A is a diagram of one embodiment of a plurality of Primary Identification Code Servers operating in national mode. As in local mode, in which a PICS shares mailpiece identification information with one or more SICS and one or more PICS (see FIG. 13), in national mode, a PICS additionally shares mailpiece identification with other PICS via one or more Electronic Post Offices (EPOs). As shown in FIG. 15A, a plurality of PICS 1505 are connected to a plurality of EPOs 1502. In one implementation, PICS 1510, PICS 1511, and PICS 1512 are connected to ICS Electronic Post Office West 1504, ICS Electronic Post Office Central 1506, and ICS Electronic Post Office East 1508 via a network (not shown). Any number of PICS can be connected to any number of EPOs. This national mode implementation allows for broad interoperability among an unlimited number of PICS and EPOs. For example, as shown in FIG. 15A, PICS 1510 may receive identification files for all mailpieces processed by all PICS in an ICS system 600. By allowing PICS 1510 to communicate with one or more of EPOs 1504, 1506, and 1508, the identification files for mailpieces bound for areas served by PICS 1511 and PICS 1512 are also sent from PICS 1510 to PICS 1511 and PICS 1512. Therefore, national mode allows for complete interoperability among all the components of an ICS system 600.

Figure 15B:
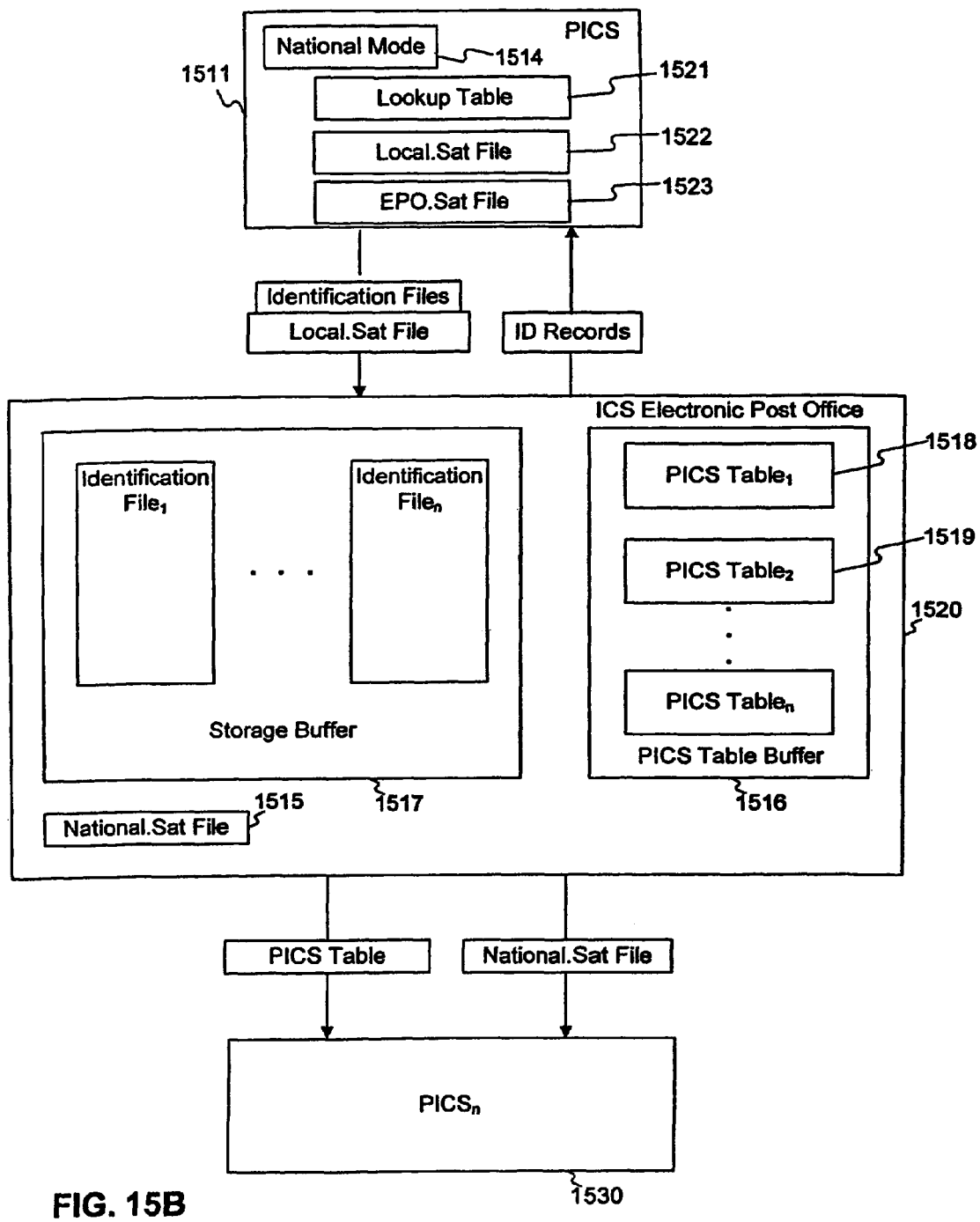
FIG. 15B illustrates one embodiment of a process by which the sharing of mailpiece identification files takes place in national mode, as shown in FIG. 15A.

FIG. 15B illustrates one embodiment of a process by which the sharing of mailpiece identification files takes place in national mode, as shown in FIG. 15A. As shown in FIG. 15B, in national mode, PICS 1510 collects identification files in Lookup Table 1512, as described above. PICS 1510 then determines which of the identification files in Lookup Table 1512 are served by other PICS/SICS systems using a Local.Sat file 1514, as described above. PICS 1510 maintains an EPO.Sat file 1513 to define what records are to be sent to other PICS via EPOs. In one embodiment, Local.Sat file 1514 can contain a list of all ZIP codes served by PICS 1510 (as well as any SICS connected to PICS 1510). In this embodiment, EPO.Sat file 1513 can be the inverse of Local.Sat file 1514. PICS 1510 can have a National Mode indicator 1511. In national mode, PICS 1510 periodically sends these identification files to a primary EPO 1520 via a network connection (not depicted). PICS 1510 also sends a copy of Local.Sat file 1514 to primary EPO 1520. Local.Sat file 1514 contains a list of all the ZIP codes served by PICS 1510. In one implementation, PICS 1510 may also have a secondary EPO for use in case primary EPO 1520 is unavailable or inoperative (not shown).

Once PICS 1510 has transferred the identification files to EPO 1520, EPO 1520 collects and stores the identification files in a Storage Buffer 1514. EPO 1520 also collects and stores any Local.Sat files 1514 in a plurality of Table Buffers 1516. Each PICS table 1518 in PICS Table Buffer 1516 is created using the Local.Sat files received from the plurality of PICS operating in national mode, such as, PICS 1510. For example, when EPO 1520 receives Local.Sat file 1514 from PICS 1510, EPO 1520 creates a PICS Table 1518 corresponding to PICS 1510. Thereafter, in an implementation based on ZIP codes, as EPO 1520 receives identification files from other PICS, EPO 1520 stores the identification files matching the ZIP codes in PICS Table Buffer 1516 in the corresponding PICS Table for each respective PICS (e.g., if the ZIP code matches the ZIP codes in PICS Table 1518 corresponding to Local.Sat file 1514, the identification file is matched to PICS Table 1518). At predetermined intervals (similar to the predetermined intervals described above), EPO 1520 then sends a copy of each PICS Table in PICS Table Buffer 1516 to its corresponding PICS. For example, if EPO 1520 collects identification files corresponding to PICS 1530 into a PICS Table 1519, EPO 1520 may send PICS table 1519 to PICS 1530. Additionally, EPO 1520 may also send a copy of National.Sat file 1515 to PICS 1530. National.Sat file 1515 is a compilation of all Local.Sat files received by EPO 1520. National.Sat file 1518 can be used by EPO 1520 to monitor all areas services by ICS system 600. If a copy is transferred from EPO 1520 to PICS 1530, National.Sat file 1518 can also be used by PICS 1530 to monitor all areas that are served by ICS system 600.

E. Common Sorter Software

As described above, as shown in FIGS. 12 and 13, both PICS and SICS exchange information with Bar Code Sorters (BCS). For example, PICS 1200 in FIG. 13 exchanges information with a plurality of BCS 1302, and a plurality of SICS 1304 exchange information with a plurality of BCS 1306. Throughout ICS system 600, different types of BCS are used to read identification information from a mailpiece and process the mailpiece through a PICS or a SICS. Accordingly, using the same example from FIG. 13, a common sorter software is needed to allow PICS 1200 and SICS 1304 to exchange information with BCS 1302 and BCS 1306, respectively.

Figure 16:
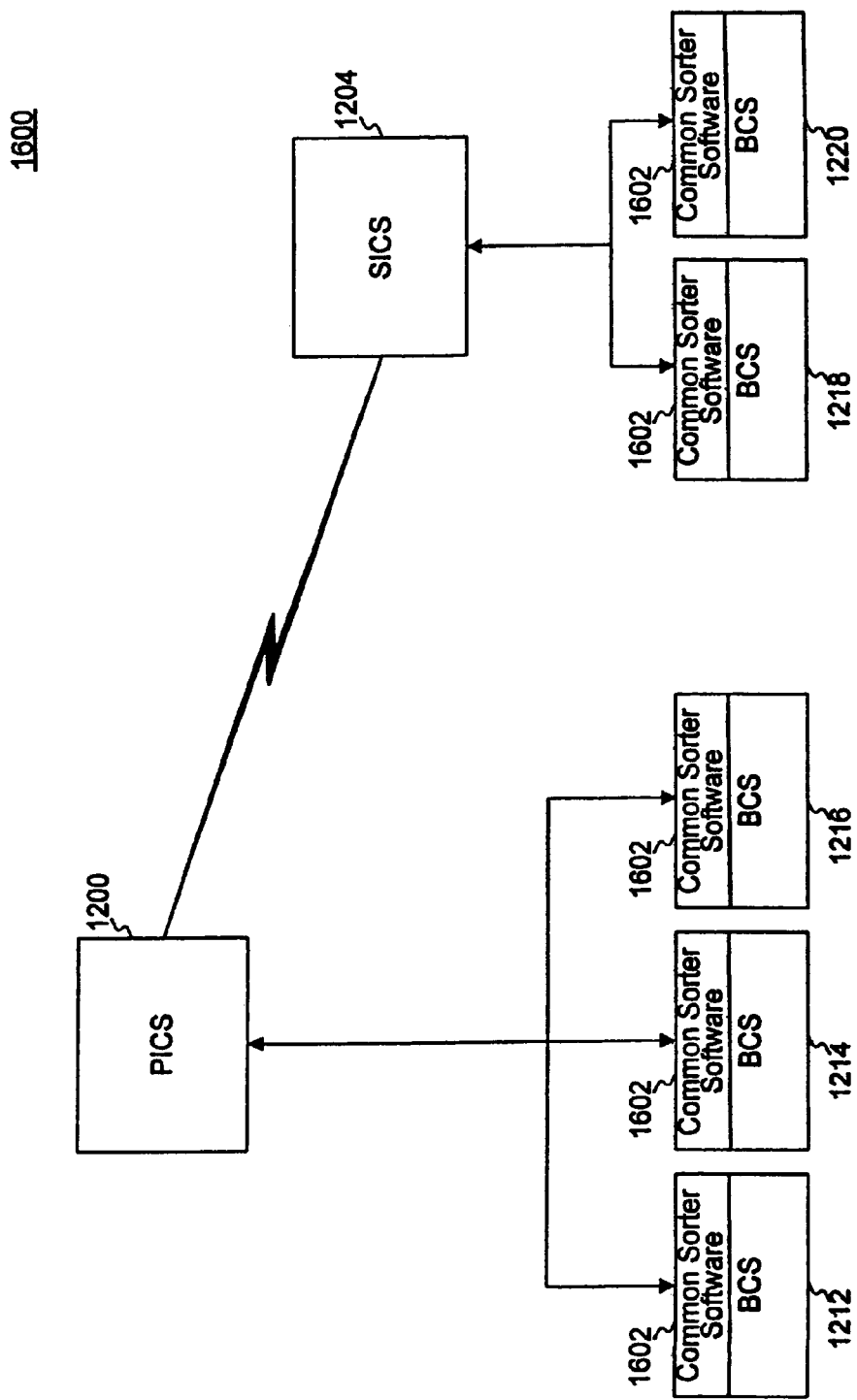
FIG. 16 depicts one embodiment of a PICS/SICS system incorporating Common Sorter Software.

FIG. 16 depicts one embodiment of a PICS/SICS system incorporating Common Sorter Software. Common Sorter Software 1602 performs a number of tasks, including, for example, initiating a connection between a BCS and a PICS and/or SICS, transmitting information between the BCS and the PICS and/or SICS, and terminating the connection between the BCS and the PICS and/or SICS. In this way, PICS 1200 processes mailpiece information for BCS 1212, 1214, and 1216, using Common Sorter Software 1602. Additionally, SICS 1204 processes mailpiece information for BCS 1218 and 1220, using Common Sorter Software 1602. Regardless of the type of BCS, Common Sorter Software 1602 provides a common interface between the BCS and a PICS and/or SICS. Therefore, Common Sorter Software 1602 is infinitely compatible (with any BCS) and infinitely expandable (to any number of BCS devices). Notably, in one implementation, Common Sorter Software 1602 is software, but Common Sorter Software 1602 may also be hardware.

Figure 17:
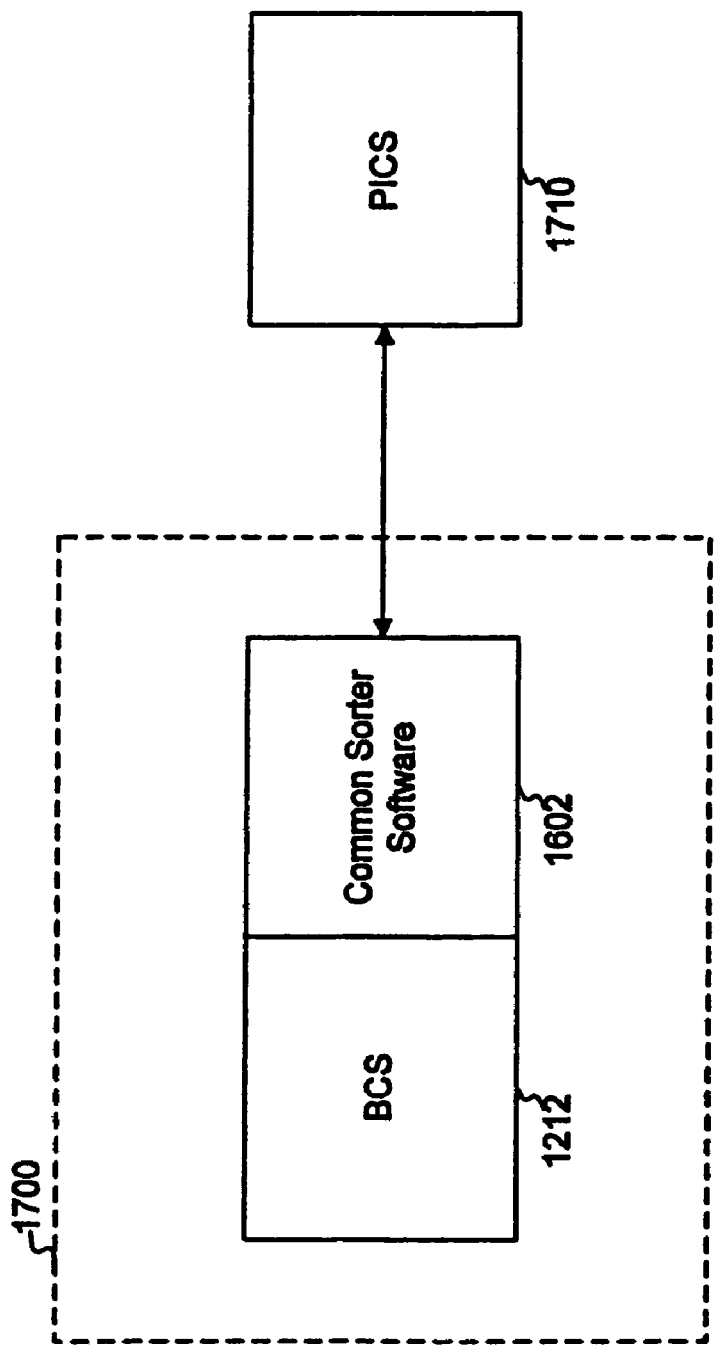
FIG. 17 is a block diagram of one embodiment of a Bar Code Sorter (BCS) system using Common Sorter Software to connect to a PICS.

FIG. 17 is a block diagram of one embodiment of a Bar Code Sorter (BCS) system using Common Sorter Software to connect to a PICS. BCS system 1700 includes BCS 1212 and Common Sorter Software 1602. Common Sorter Software 1602 provides an interface between BCS system 1700 and PICS 1710. Of course, one skilled in the art would understand that other BCS may be similarly configured or that BCS 1212 may use Common Sorter Software 1602 to interface with a SICS rather than a PICS (i.e., PICS 1700).

Figure 18:
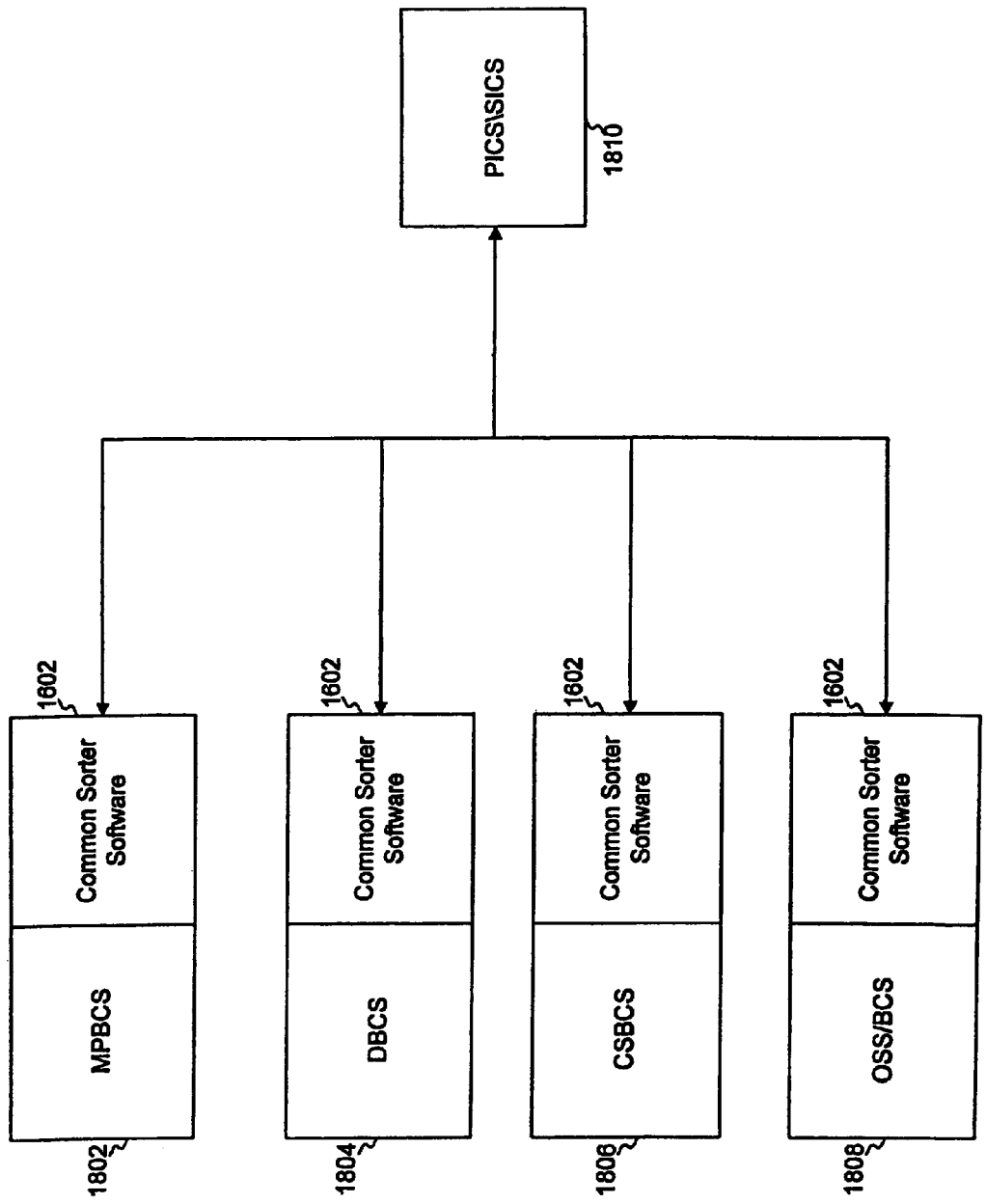
FIG. 18 illustrates various embodiments of Bar Code Sorters using Common Sorter Software to connect to a PICS/SICS such as the BCS systems shown in FIG. 17.

FIG. 18 illustrates various embodiments of Bar Code Sorters using Common Sorter Software to connect to a PICS/SICS such as the BCS systems shown in FIG. 17. As illustrated in FIG. 18, Common Sorter Software 1602 can be used with a Mail Processing Bar Code Sorter (MPBCS) 1802, a Downstream Bar Code Sorter (DBCS) 1804, a Carrier Sequence Bar Code Sorter (CSBCS) 1806, an Output Subsystem/Bar Code Sorter (OSS/BCS) 1808, or any other type of Bar Code Sorter.

Figure 19A:
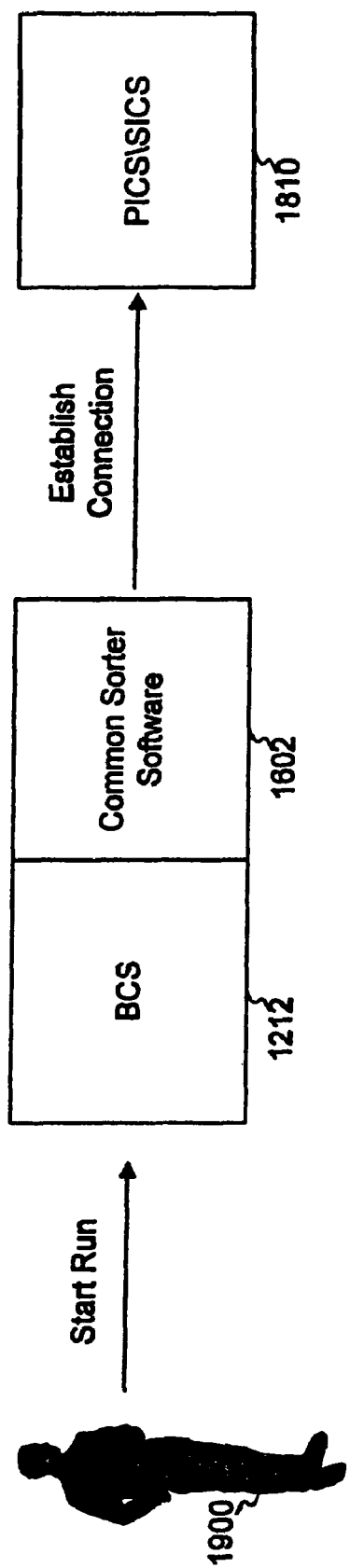
FIGS. 19A-19C illustrate one embodiment for a process used by one embodiment of Common Sorter Software during the identification and processing of a mailpiece by any of the Bar Code Sorters (BCS), such as those shown in FIG. 18.
Figure 19B:
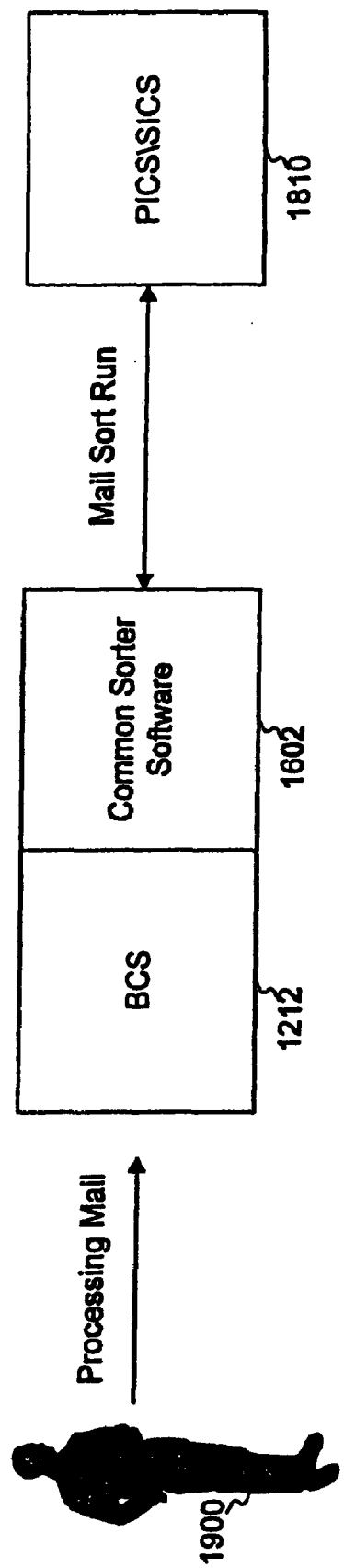
Figure 19C:
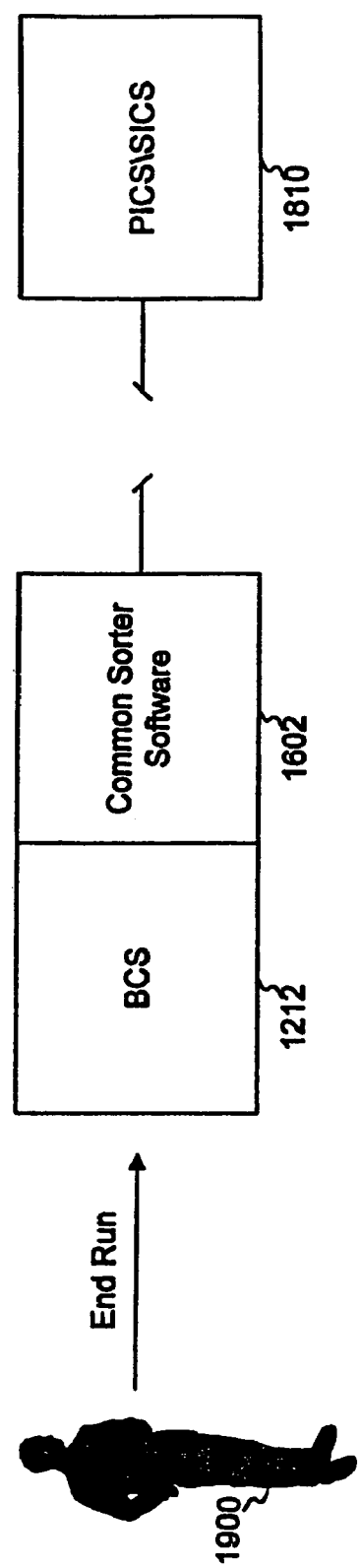

FIGS. 19A-19C illustrate one embodiment for a process used by one embodiment of Common Sorter Software during the identification and processing of a mailpiece by any of the Bar Code Sorters (BCS), such as those shown in FIG. 18. First, as shown in FIG. 19A, after an operator 1900 has loaded the mailpieces into BCS 1212, operator 1900 enters a 'Start Run' command into BCS 1212. BCS 1212 then begins the process of attempting to identify and process the mailpieces. During this process, a connection with a PICS/SICS 1810 may become necessary. BCS 1212 uses Common Sorter Software 1602, to establish a connection with PICS/SICS 1810. As shown in FIG. 19B, operator 1900 can constantly supervise the identification and processing of the mailpieces on, BCS 1212 (i.e., throughout the "mail sort run"). During this period, BCS 1212 uses Common Sorter Software 1602 to communicate with PICS/SICS 1810 throughout the mail sort run. As shown in FIG. 19C, once the mail sort run is complete, operator 1900 enters an 'End Run' command into BCS 1212, and Common Sorter Software 1602 breaks the connection with PICS/SICS 1810 until the next mail sort run. One skilled in the art would be aware of alternative processes by which BCS 1212 could connect with PICS/SICS 1810 via Common Sorter Software 1602.

F. Universal ID Tag Reader

As described above, as shown in FIGS. 12 and 13, a Bar Code Sorter (BCS) is used by ICS system 600 to read information from a mailpiece and to identify and process the mailpiece according to the information. As also described above, ICS system 600 uses special codes for the identification and processing of mail, namely, the POSTNET code (on the front of the mailpiece) and the identification code (on the back of the mailpiece). To read the identification code off the back of the mailpiece, RBCS 500 and ICS system 600 include special apparatus and processes, such as an ID Tag Reader (in RBCS 500) and an Universal ID Tag Reader (in ICS system 600).

Figure 20:
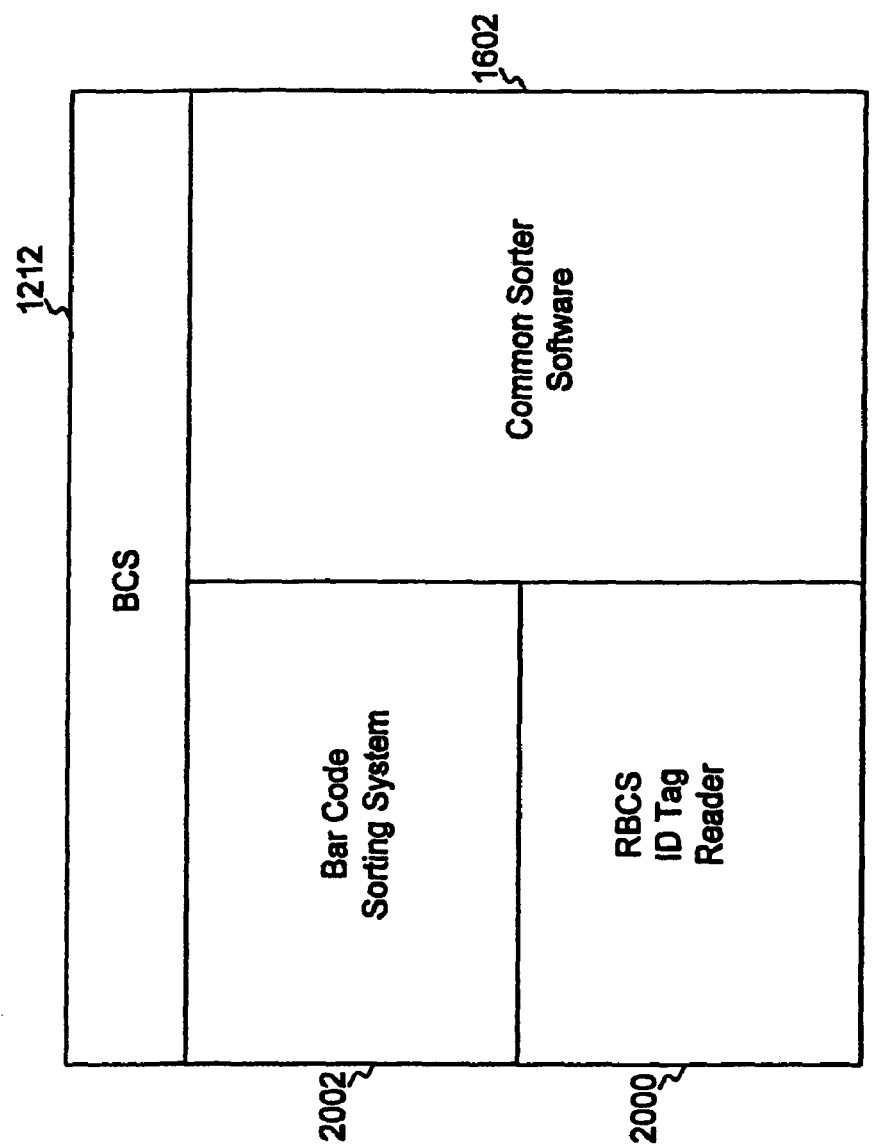
FIG. 20 is a block diagram of a Bar Code Sorter (BCS) consistent with one embodiment of the present invention, for example, as used by a RBCS, which includes, for example, an RBCS ID Tag Reader.

FIG. 20 is a block diagram of a Bar Code Sorter (BCS) consistent with one embodiment of the present invention, for example, as used by a RBCS, which includes, for example, an RBCS ID Tag Reader. BCS 1212 includes a Bar Code Sorting System 2002, Common Sorter Software 1602, and a RBCS ID Tag Reader 2000. As described above, RBCS 500 makes only limited use of an identification code, because identification files are temporary and may only be used locally. For this reason, RBCS ID Tag Reader 2000 is generally used with a single type of BCS, namely, the OSS/BCS 1808, as shown in FIG. 18.

Figure 21:
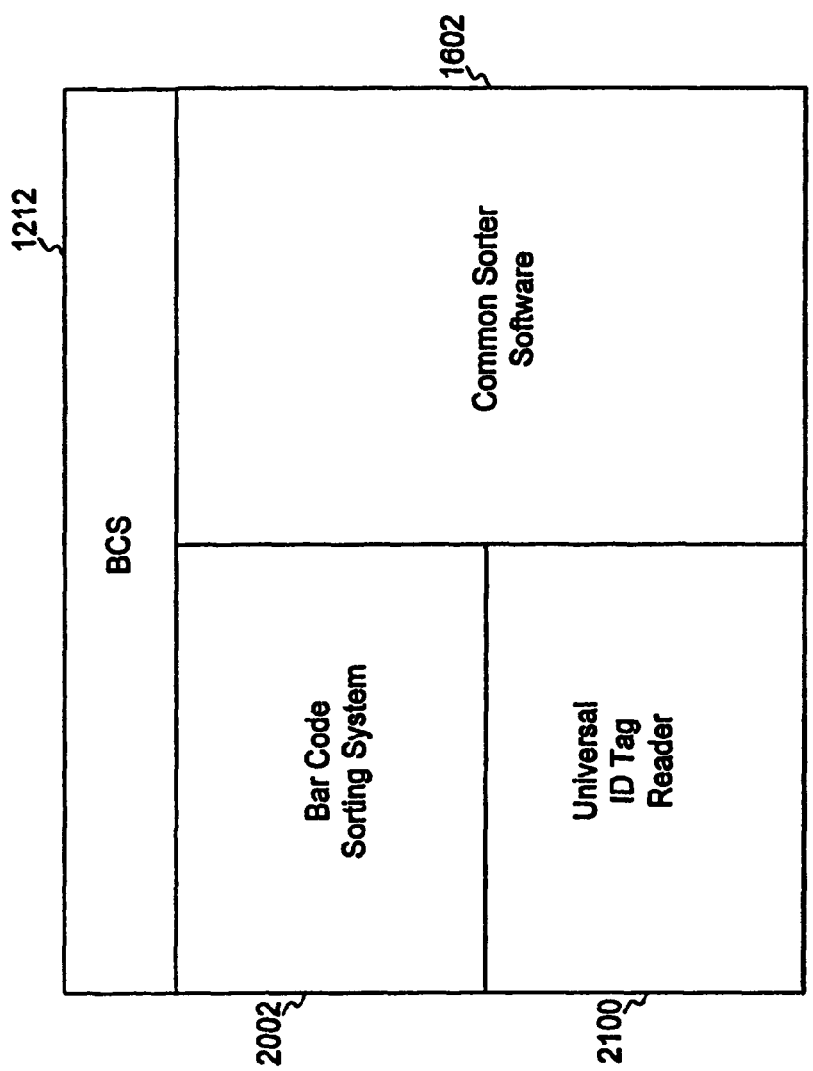
FIG. 21 is a block diagram of a Bar Code Sorter (BCS) consistent with one embodiment of the present invention, for example, as used by an ICS system, which includes, for example, a Universal ID Tag Reader.

FIG. 21 is a block diagram of a Bar Code Sorter (BCS) consistent with one embodiment of the present invention, for example, as used by an ICS system, which includes, for example, a Universal ID Tag Reader. BCS 1212 in ICS system 600 includes Bar Code Sorting System 2002, Common Sorter Software 1602, and a Universal ID Tag Reader 2100. As described above, ICS system 600 makes widespread use of an identification code, and therefore, Universal ID Tag Reader 2100 has many applications. For example, Universal ID Tag Reader 2100 can be used on any type of BCS, including MPBCS 1802, DBCS 1804, CSBCS 1806, and OSS/BCS 1808, as shown in FIG. 18.

Figure 22:
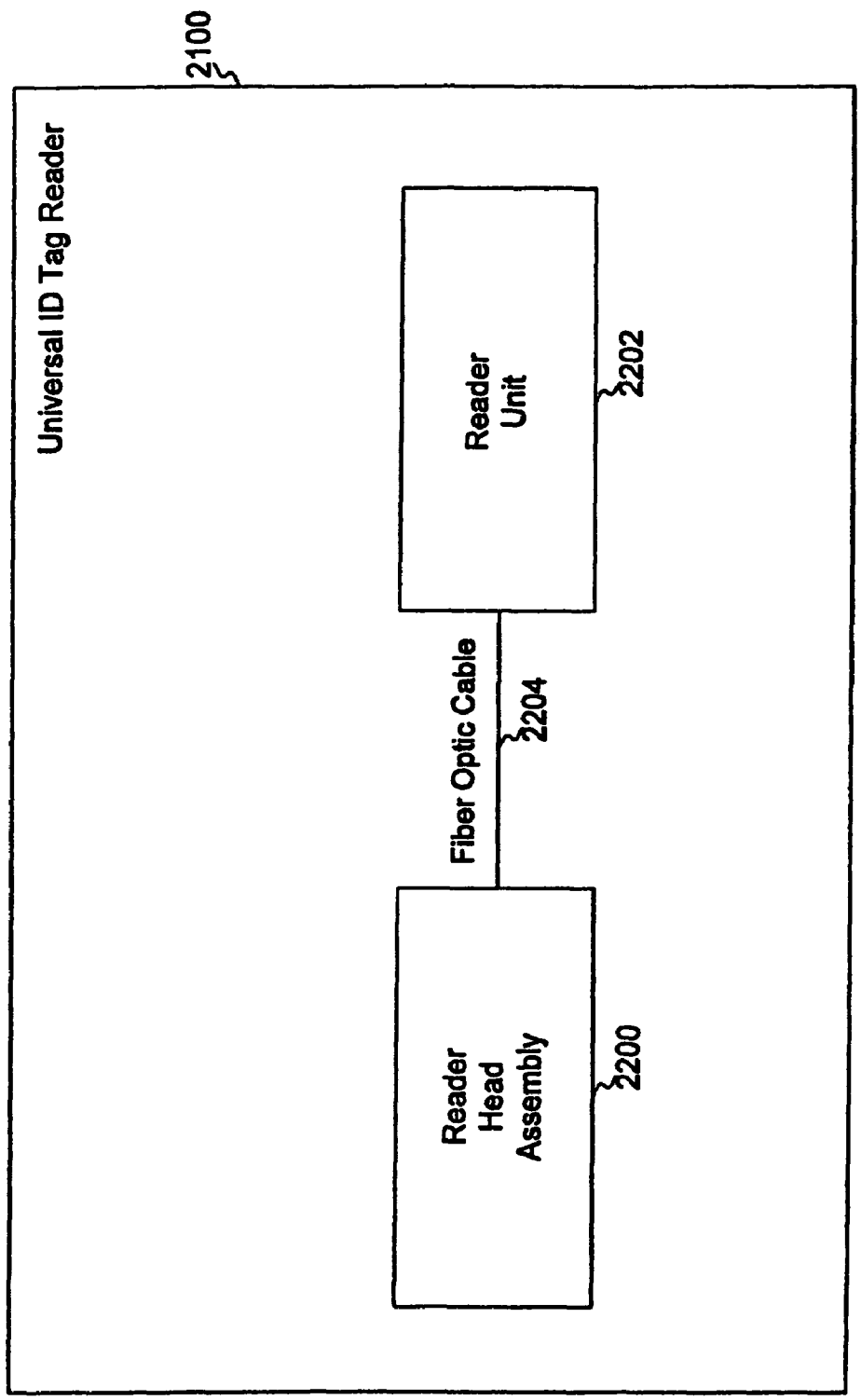
FIG. 22 is a block diagram of one embodiment of a Universal ID Tag Reader (UIDTR)

FIG. 22 is a block diagram of one embodiment of a Universal ID Tag Reader (UIDTR). UIDTR 2100 includes two main components: a Reader Head Assembly 2200 and a Reader Unit 2202 connected by a Fiber Optic Cable 2204. Notably, because Reader Head Assembly 2200 is separate from Reader Unit 2202, Reader Head Assembly 2200 may be placed in an assortment of different positions within ICS system 600, connected by Fiber Optic Cable 2204. In contrast to RBCS ID Tag Reader 2000, therefore, UIDTR 2100 has increased flexibility and usability in ICS system 600.

Figure 23:
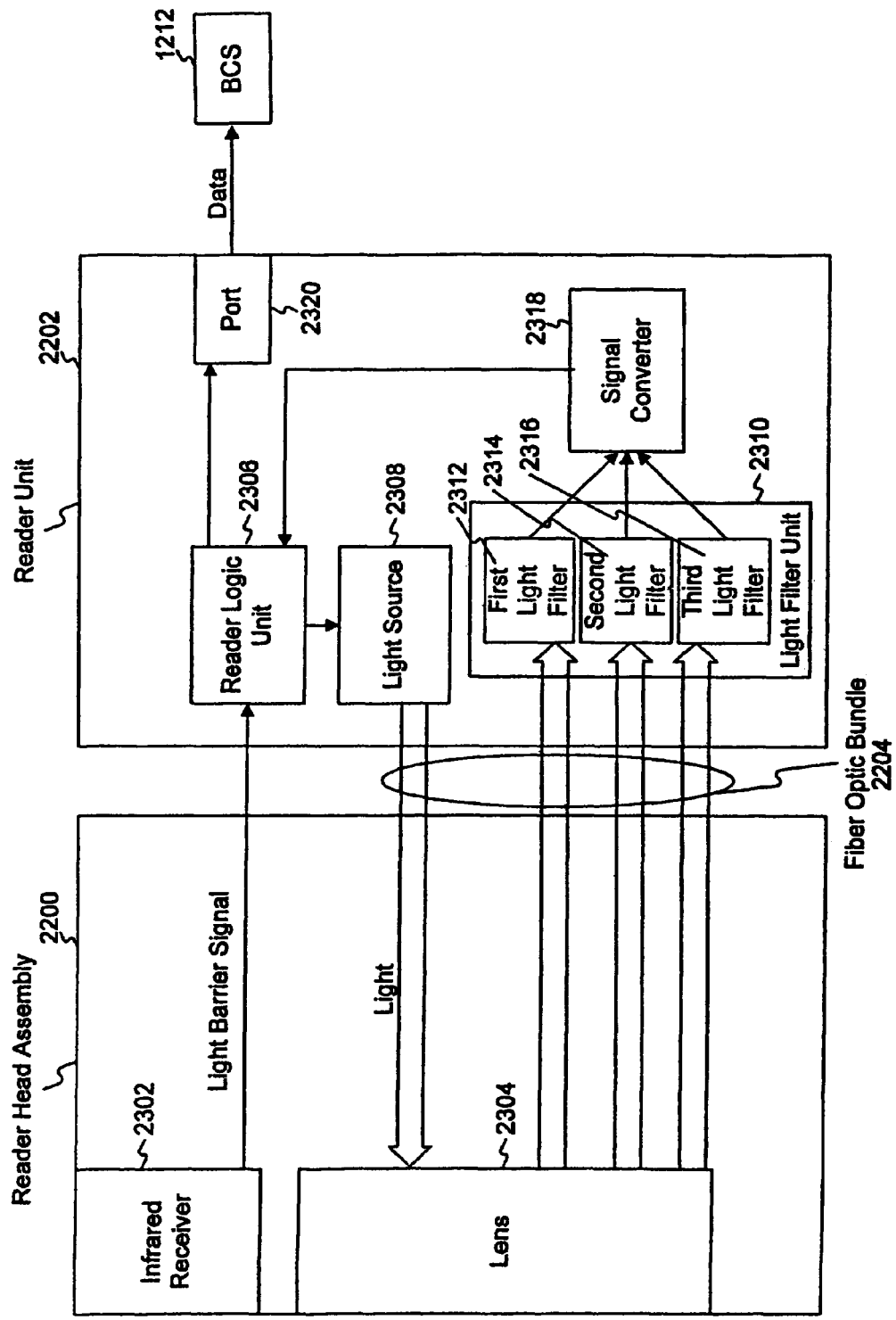
FIG. 23 illustrates one embodiment of a UIDTR in greater detail, as shown in FIG. 22.

FIG. 23 illustrates one embodiment of a UIDTR in greater detail, as shown in FIG. 22. Reader Head Assembly 2200 includes an Infrared Receiver 2302 and a Lens 2304. Reader Unit 2202 includes a Reader Logic Unit 2306, a Light Source 2308, a Light Filter Unit 2310, a Signal Converter 2318, and a Port 2320. In this embodiment, Light Filter Unit 2310 includes a first Light Filter 2312, a second Light Filter 2314, and a third Light Filter 2316. One skilled in the art would recognize that other embodiments may be used for the arrangement of light filters in Reader Unit 2202. Reader Head Assembly 2200 is connected to Reader Unit 2202 via Fiber Optic Bundle 2204.

Figure 24A:
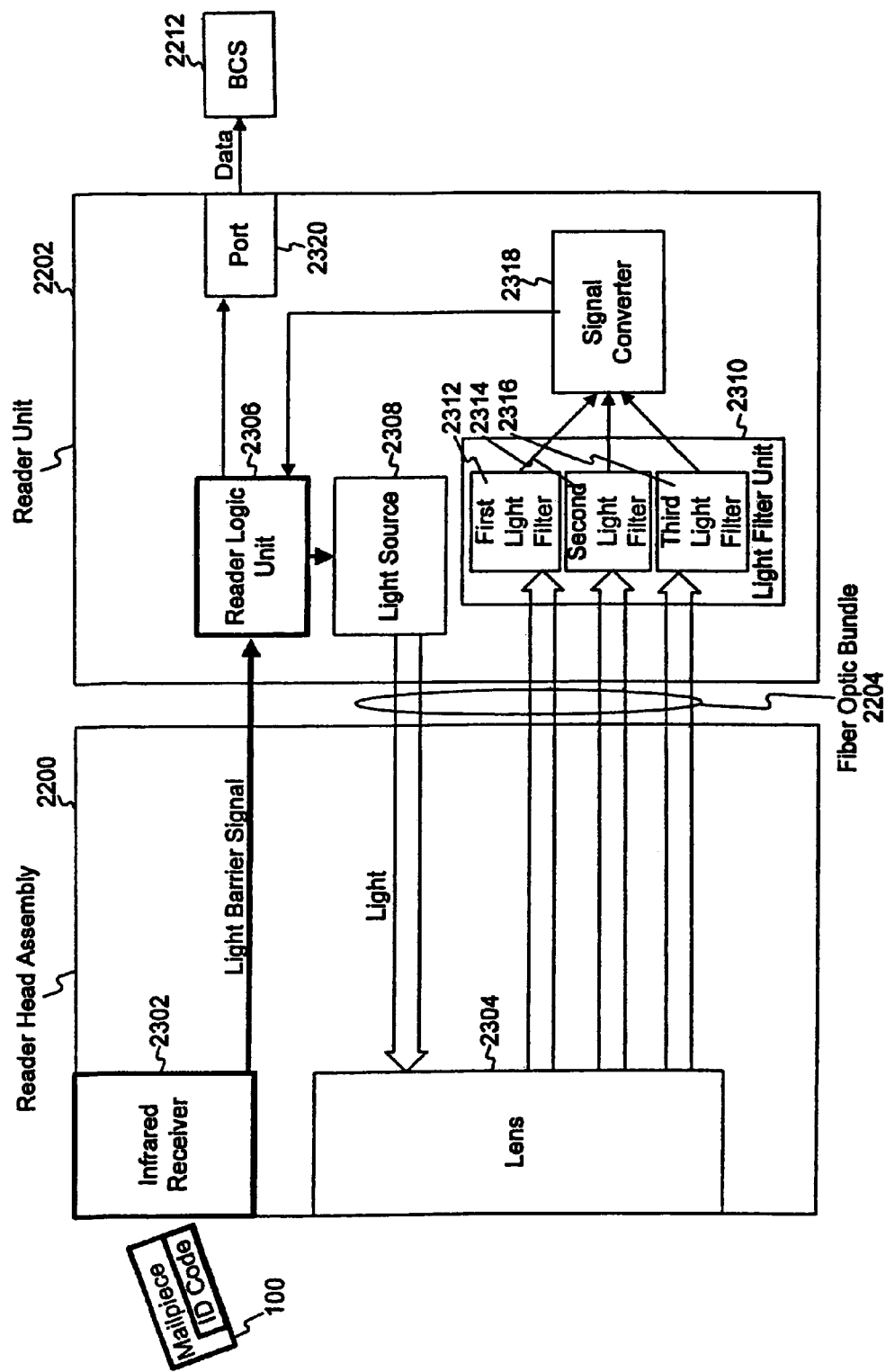
FIGS. 24A-24D illustrate the operation of one embodiment of a UIDTR while processing a mailpiece, according to one embodiment of the invention.
Figure 24B:
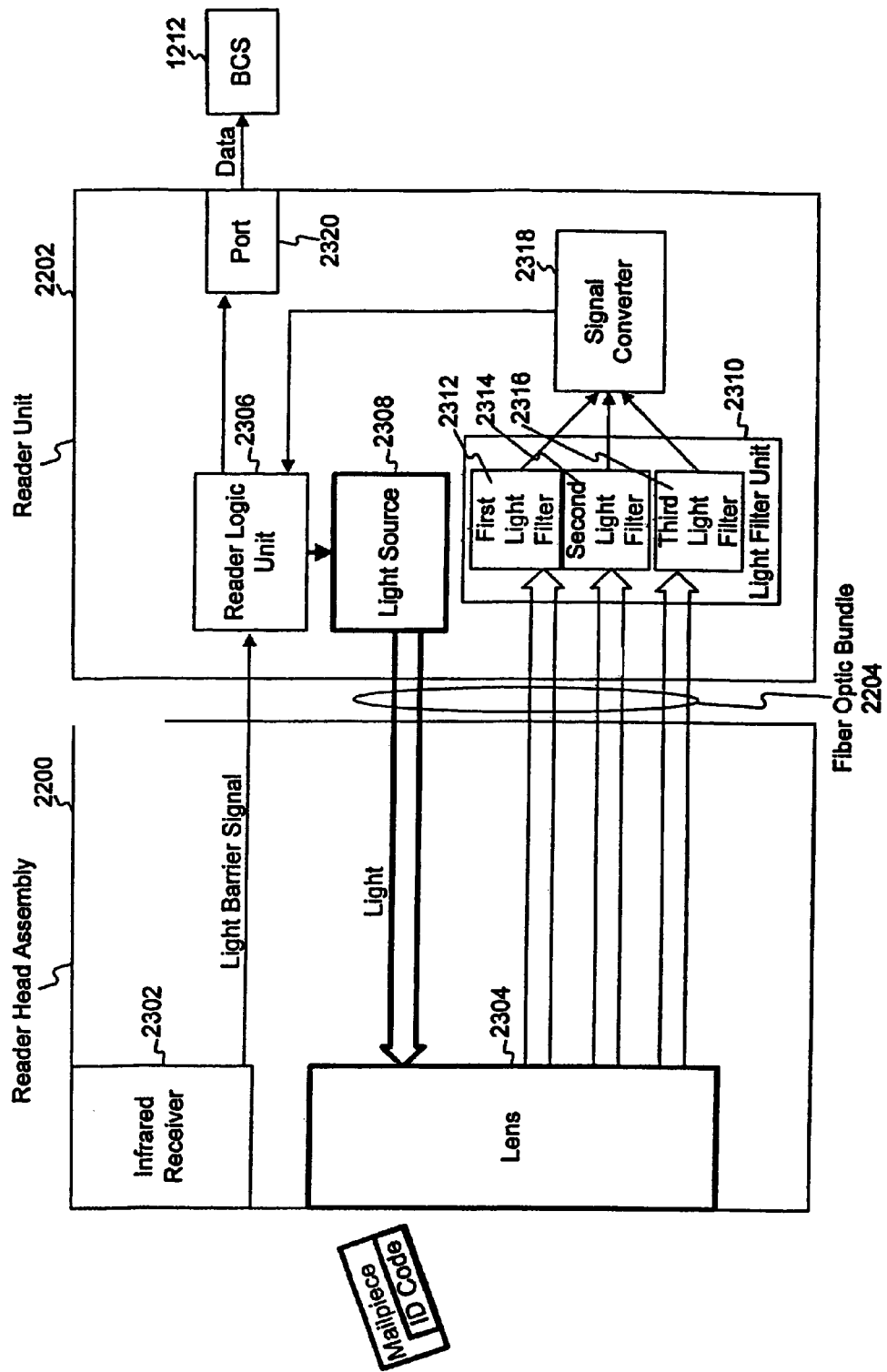
Figure 24C:
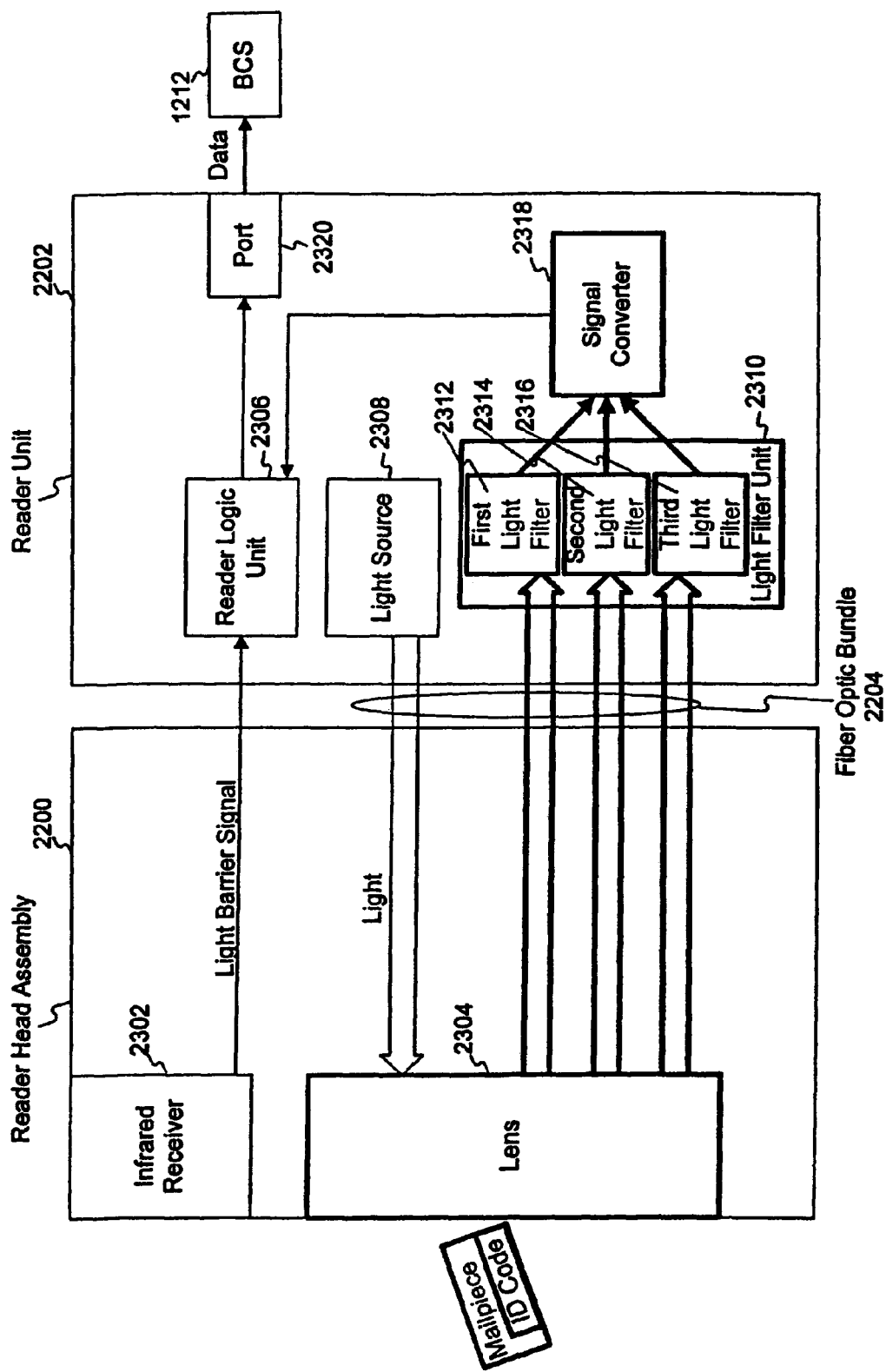
Figure 24D:
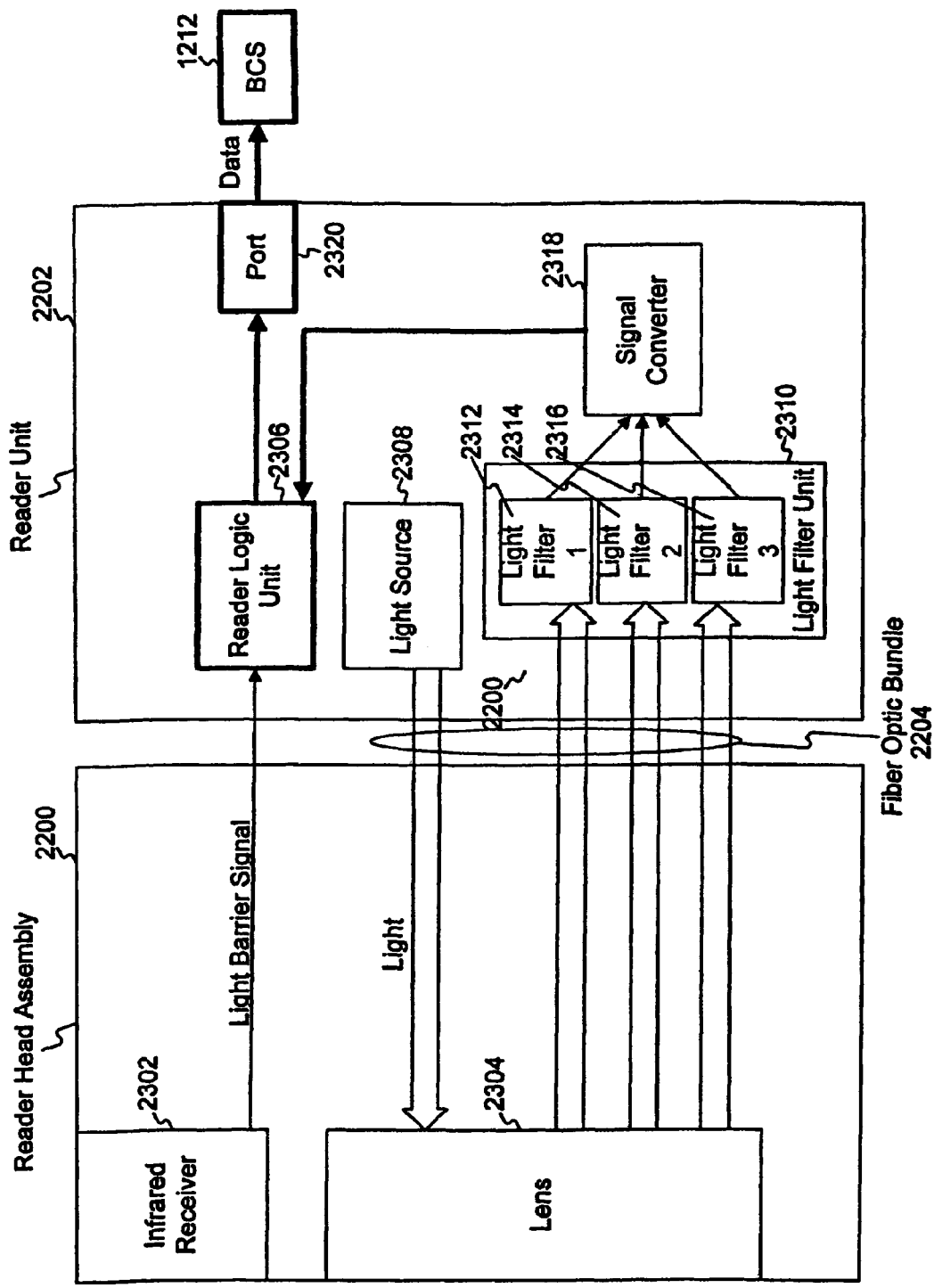

FIGS. 24A-24D illustrate the operation of one embodiment of a UIDTR while processing a mailpiece, according to one embodiment of the invention. As shown in FIG. 24A, mailpiece 100 includes an identification code, i.e., an ID code. When mailpiece 100 is placed before Universal ID Tag Reader 2100, a light barrier signal is generated at Infrared Receiver 2302. Infrared Receiver 2302 passes the light barrier signal to Reader Logic Unit 2306. The light barrier signal indicates that there is a mailpiece ready to be processed. As shown in FIG. 24B, reader Logic Unit 2306 then supplies power to Light Source 2308. The light from Light Source 2308 travels over Fiber Optic Bundle 2204 and illuminates the ID code on the mailpiece. As shown in FIG. 24C, lens 2304 then focuses the ID code onto Fiber Optic Bundle 2204. In one embodiment, Fiber Optic Bundle 2204 may divide the light into at least three bundles. One skilled in the art would recognize that other embodiments may be used, including less than three bundles. Each bundle is directed to a light filter in Light Filter Unit 2310. The first bundle is filtered through a First Light Filter 2312, the second bundle is filtered through a Second Light Filter 2314, and the third bundle is filtered through a Third Light Filter 2316. In this embodiment, the light filters (i.e., First Light Filter 2312, Second Light Filter 2314, and Third Light Filter 2316) respond to different frequencies of the fluorescent spectrum. The analog signals output by Light Filter Unit 2310 are then converted into digital signals by Signal Converter 2318, e.g., an analog/digital converter. Finally, as shown in FIG. 24D, the digital signal from Signal Converter 2318 is passed to Reader Logic Unit 2306, where the digital signal is converted into an ID code corresponding to the ID code on mailpiece 100. Reader Logic Unit 2306 passes the ID code to Port 2320, and the ID code is passed back to BCS 1212.

Figure 25:
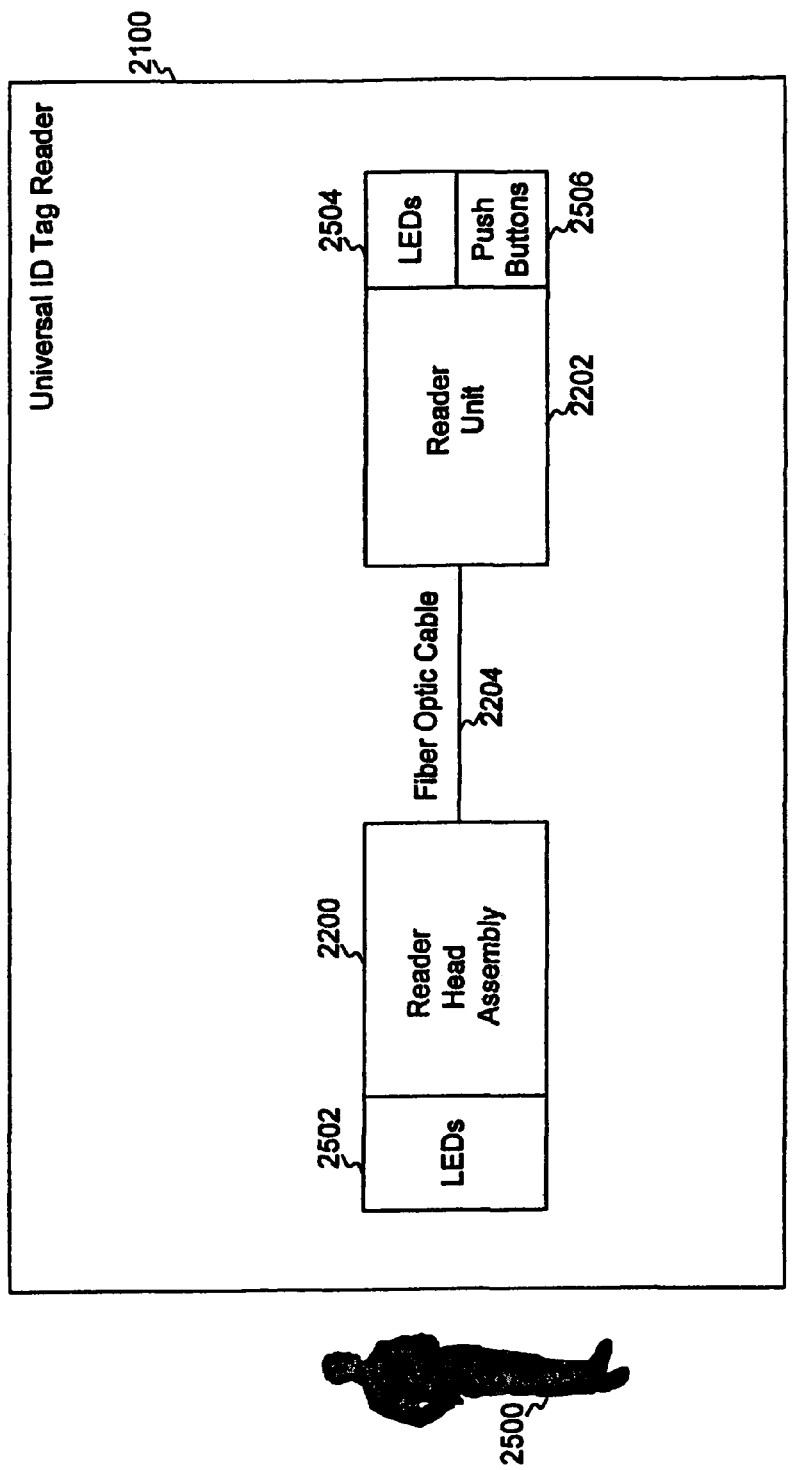
FIG. 25 shows optional components of an embodiment of a UIDTR such as the UIDTR in FIG. 22.

FIG. 25 shows optional components of an embodiment of a UIDTR such as the UIDTR in FIG. 22. As shown in FIG. 25, an operator 2500 can operate Universal ID Tag Reader 2100 using one or more Light Emitting Diodes 2502 on Reader Head Assembly 2200 and one or more Light Emitting Diodes 2504 and Push Buttons 2506, located on Reader Unit 2202. Light Emitting Diodes 2502 and/or Light Emitting Diodes 2504 can display diagnostic information, such as 'System OK' or 'Power OK,' or function options, such as 'Reset,' to operator 2500. Operator 2500 can use Push Buttons 2506 to display diagnostic information, to select function options or to input other data.

Figure 26:
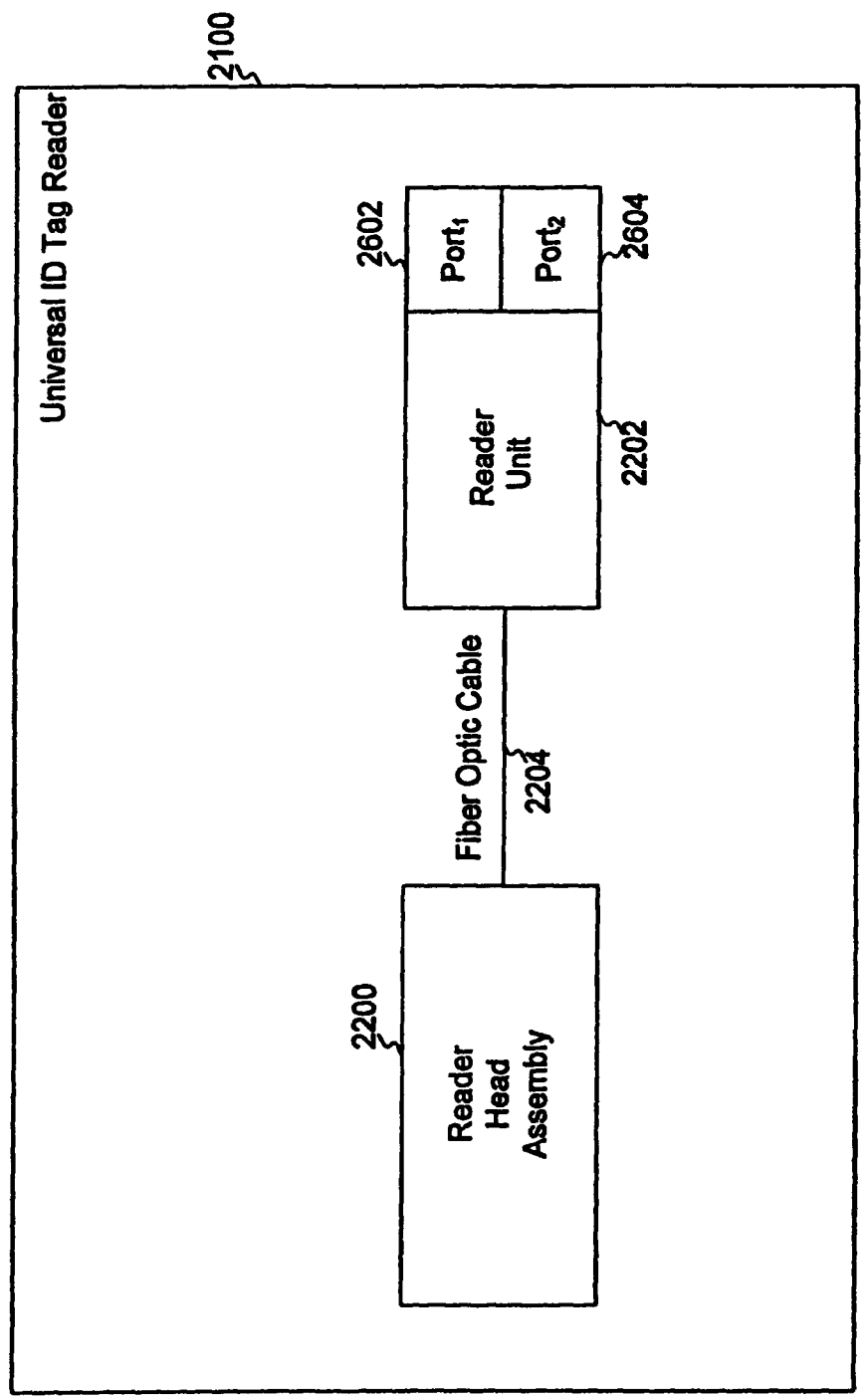
FIG. 26 shows still additional optional components of another embodiment of a UIDTR, such as the UIDTR in FIG. 22.

FIG. 26 shows still additional optional components of another embodiment of a UIDTR, such as the UIDTR in FIG. 22. Port 2602 can support, for example, transistor transistor logic (TTL) and Port 2604 can support, for example, differential logic. These optional component ports may enable, for example, UIDTR 2100 to function with an expanded variety of Bar Code Sorters.

Conclusion

As described above, therefore, it will be apparent to those skilled in the art that various modifications and variations can be made in the methods and apparatus of the present invention without departing from the spirit and scope of the invention. Thus, it is intended that the present invention cover the modifications and variations of this invention, provided they come within the scope of the appended claims and their equivalents. In this context, equivalents mean each and every implementation for carrying out the functions recited in the claims, even if not explicitly described herein.

The invention claimed is:

1. A method of identifying a mailpiece having a first identification code using a second identification code on the mailpiece and sorter application hardware, comprising:
   failing to identify the mailpiece based on a first identification code, wherein the failing occurs when the first identification code is illegible;
   receiving a first prompt from an operator of a mail processing device;
   initiating a connection between the mail processing device and an identification code server, via the sorter application hardware, in response to the first prompt;
   processing mailpiece information between the mail processing device and the identification code server based, at least in part, on the second identification code and via the sorter application hardware;
   receiving a second prompt from the operator of the mail processing device; and
   terminating the connection between the mail processing device and the identification code server, in response to the second prompt,
   wherein the first identification code is printed on a first side of the mailpiece and the second identification code is printed on a second side of the mailpiece.

2. The method of claim 1, wherein the identification code server is a PICS server.

3. The method of claim 1, wherein the identification code server is a SICS server.

4. The method of claim 1, wherein the mail processing device is a bar code sorter.

5. The method of claim 1, wherein the first prompt is a start-run message.

6. The method of claim 1, wherein the second prompt is an end-run message.

7. The method of claim 1, wherein processing further comprises:
   transmitting information from the mail processing device to the identification code server; and
   receiving information from the identification code server at the mail processing device.

8. The method of claim 1, wherein the mail processing device is a Mail Processing Bar Code Sorter.

9. The method of claim 1, wherein the mail processing device is a Delivery Bar Code Sorter.

10. The method of claim 1, wherein the mail processing device is a Carrier Sequence Bar Code Sorter.

11. The method of claim 1, wherein the mail processing device is an Output Subsystem/Bar Code Sorter.

12. The method of claim 1, wherein the mailpiece information includes a postal code.

13. The method of claim 12, wherein the postal code is a POSTNET code.

14. The method of claim 1, wherein at least one of the first identification code and the second identification code is an ID tag.

15. The method of claim 1, further comprising:
   passing a parameter from the sorter application hardware to the identification code server to indicate a mail processing device type.

16. The method of claim 1, wherein the sorter application hardware is on a network.

17. A method of identifying a mailpiece having a first identification code using a second identification code on the mailpiece and sorter application hardware, comprising the steps of:
   failing to identify the mailpiece based on a first identification code, wherein the failing occurs when the first identification code is illegible;
   receiving a first prompt from an operator of a mail processing device;
   initiating a connection between the mail processing device and an identification code server, via the sorter application hardware, in response to the first prompt;
   processing mailpiece information between the mail processing device and the identification code server based, at least in part, on the second identification code and via the sorter application hardware;
   receiving a second prompt from the operator of the mail processing device; and
   terminating the connection between the mail processing device and the identification code server, in response to the second prompt,
   wherein the first identification code is on a front of the mailpiece and the second identification code is on a back of the mailpiece.

18. The method of claim 17, wherein the mailpiece information includes a postal code.

19. A tangible computer-usable medium having computer-executable code embodied therein that, when executed by a computer system, performs a method for identifying a mailpiece having a first identification code using a second identification code on the mailpiece, the method comprising:
   identifying the mailpiece based on the second identification code after it is determined that the first identification code is illegible;
   receiving a first prompt from an operator of a mail processing device;
   initiating a connection between the mail processing device and an identification code server, via the sorter application hardware, in response to the first prompt;
   processing mailpiece information between the mail processing device and the identification code server based, at least in part, on the second identification code and via the sorter application hardware;
   receiving a second prompt from the operator of the mail processing device; and terminating the connection between the mail processing device and the identification code server, in response to the second prompt, wherein the first identification code is printed on a first side of the mailpiece and the second identification code is printed on a second side of the mailpiece.

20. The tangible computer-usable medium of claim 19, wherein the first side is a front of the mailpiece and the second side is a back of the mailpiece.

\* \* \* \* \*